(12) United States Patent
Zhu et al.

(10) Patent No.: US 11,825,539 B2
(45) Date of Patent: Nov. 21, 2023

(54) BLUETOOTH CONNECTION METHOD AND ELECTRONIC DEVICE

(71) Applicant: Huawei Technologies Co., Ltd., Shenzhen (CN)

(72) Inventors: Yuhong Zhu, Shanghai (CN); Junfeng Lu, Shenzhen (CN); Jingjing Zhang, Xi'an (CN); Guanjun Ni, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/640,639

(22) PCT Filed: Sep. 4, 2020

(86) PCT No.: PCT/CN2020/113585
§ 371 (c)(1),
(2) Date: Mar. 4, 2022

(87) PCT Pub. No.: WO2021/043286
PCT Pub. Date: Mar. 11, 2021

(65) Prior Publication Data
US 2022/0408505 A1  Dec. 22, 2022

(30) Foreign Application Priority Data

Sep. 6, 2019  (CN) .......................... 201910844436.1

(51) Int. Cl.
*H04W 76/15*  (2018.01)
*H04W 4/80*  (2018.01)
*H04R 1/10*  (2006.01)

(52) U.S. Cl.
CPC .......... *H04W 76/15* (2018.02); *H04R 1/1041* (2013.01); *H04W 4/80* (2018.02); *H04R 2420/03* (2013.01); *H04R 2420/07* (2013.01)

(58) Field of Classification Search
CPC ...... H04W 76/15; H04W 4/80; H04R 1/1041; H04R 2420/03; H04R 2420/07; H04L 69/24
(Continued)

(56) References Cited

U.S. PATENT DOCUMENTS

2011/0021142 A1  1/2011  Desai et al.
2013/0321209 A1  12/2013  Kalliola et al.
(Continued)

FOREIGN PATENT DOCUMENTS

CN  104467925 A  3/2015
CN  106131810 A  11/2016
(Continued)

*Primary Examiner* — Eugene Yun
(74) *Attorney, Agent, or Firm* — Conley Rose, P.C.

(57) ABSTRACT

A BLUETOOTH connection method includes an electronic device establishing basic rate (BR)/enhanced data rate (EDR) connection to an accessory device. The electronic device determines that the electronic device supports a dual-mode connection and that the accessory device also supports the dual-mode connection. The dual-mode connection includes the BR/EDR connection and a BLUETOOTH Low Energy (BLE) connection. The electronic device disconnects the BR/EDR connection to the accessory device, and establishes the BLE connection to the accessory device.

20 Claims, 21 Drawing Sheets

(58) Field of Classification Search
USPC .......................................................... 455/41.3
See application file for complete search history.

(56) References Cited

U.S. PATENT DOCUMENTS

| | | |
|---|---|---|
| 2017/0171697 A1* | 6/2017 | Song ................. H04M 1/72412 |
| 2017/0223615 A1 | 8/2017 | Lee et al. |
| 2018/0152891 A1* | 5/2018 | Xie .................... H04W 52/0235 |
| 2018/0220335 A1 | 8/2018 | Lee et al. |
| 2020/0275525 A1* | 8/2020 | Eriksson ............... H04W 76/14 |

FOREIGN PATENT DOCUMENTS

| | | |
|---|---|---|
| CN | 106658366 A | 5/2017 |
| CN | 106658678 A | 5/2017 |
| WO | 2016017909 A1 | 2/2016 |

* cited by examiner

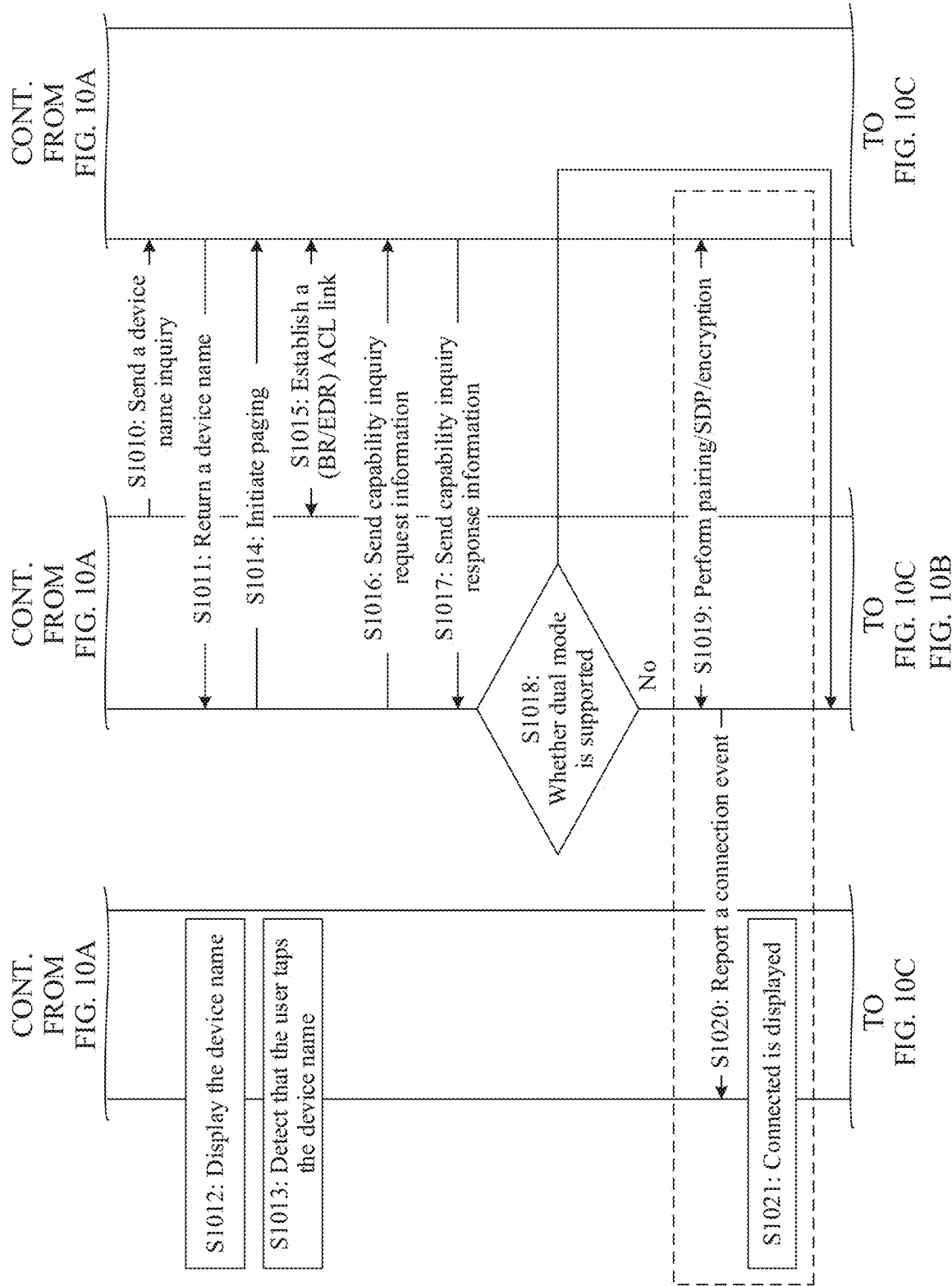

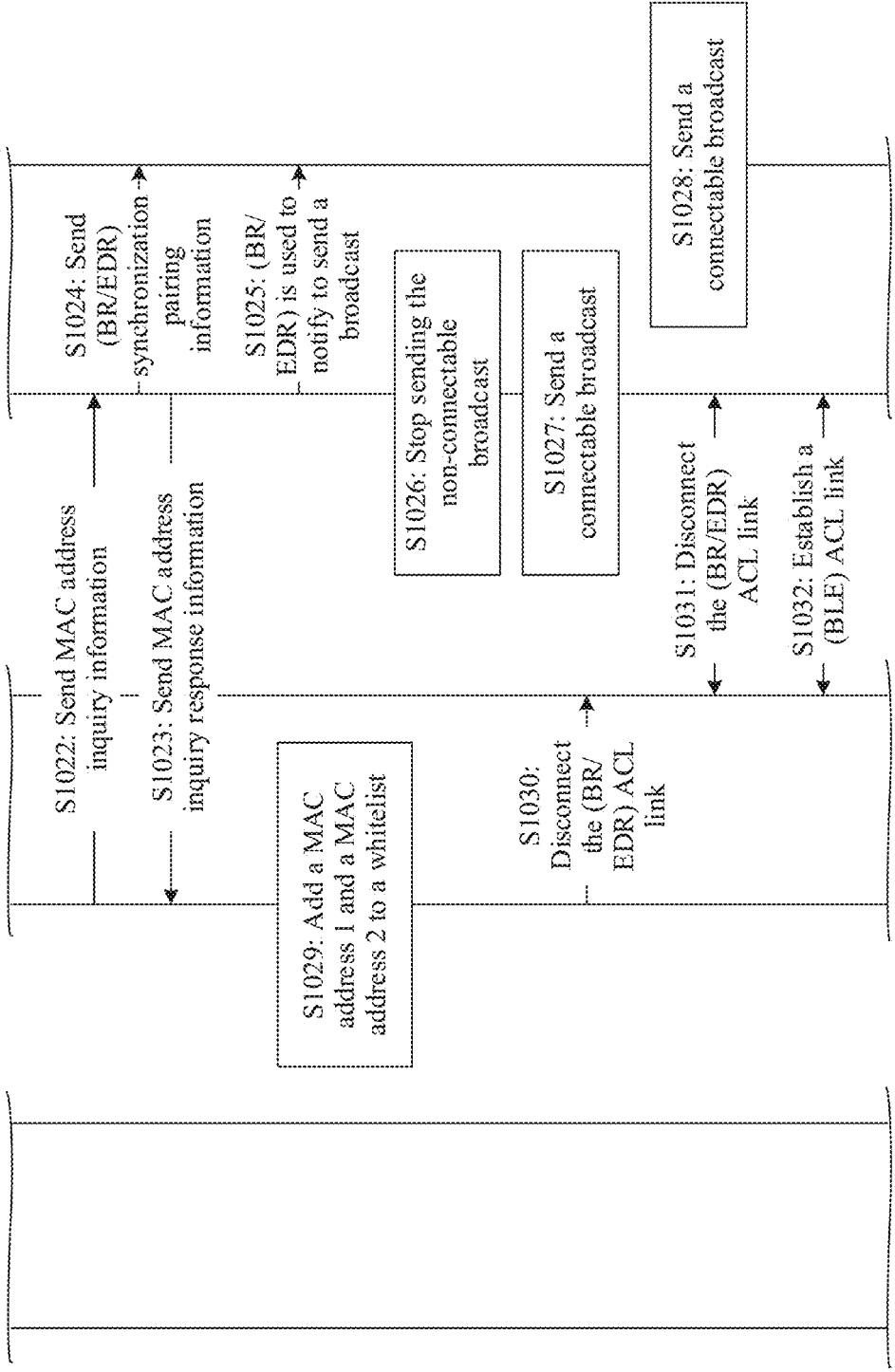

BLUETOOTH CONNECTION METHOD AND ELECTRONIC DEVICE

CROSS-REFERENCE TO RELATED APPLICATIONS

This is a U.S. National Stage of International Patent Application No. PCT/CN2020/113585 filed on Sep. 4, 2020, which claims priority to Chinese Patent Application No. 201910844436.1 filed on Sep. 6, 2019. Both of the aforementioned applications are hereby incorporated by reference in their entireties.

This application claims priority to Chinese Patent Application No. 201910844436.1, filed with the China National Intellectual Property Administration on Sep. 6, 2019 and entitled "BLUETOOTH CONNECTION METHOD AND ELECTRONIC DEVICE", which is incorporated herein by reference in its entirety.

TECHNICAL FIELD

This application relates to the communications field, and more specifically, to a Bluetooth connection method and an electronic device.

BACKGROUND

A Bluetooth (Bluetooth, BT) technology is an open global specification for wireless data communication. Based on a low-cost short-distance wireless connection, the Bluetooth technology is a near field wireless communications standard that is supported in a widest range, has most abundant functions, and is secure in the current market.

Current Bluetooth technologies mainly include a basic rate (basic rate, BR) Bluetooth technology and an enhanced data rate (enhanced data rate, EDR) Bluetooth technology. In addition, all current electronic devices are single-mode Bluetooth communications devices, that is, only a BR/EDR Bluetooth connection mode is supported. Because the BR/EDR is mainly used to transmit some large-amount data, for example, audio data, when some small-amount data (for example, data such as a heart rate and blood pressure of a user) needs to be transmitted between electronic devices through a Bluetooth connection, using of the BR/EDR connection mode causes a waste of power consumption of the electronic devices.

SUMMARY

This application provides a Bluetooth connection method, to help reduce power consumption of an electronic device when the electronic device transmits data by using a Bluetooth technology.

According to a first aspect, a system is provided, including a first electronic device and an accessory device. The first electronic device and the accessory device support a dual-mode connection, and the dual-mode connection includes a basic rate/enhanced data rate BR/EDR connection and a Bluetooth low energy (Bluetooth low energy, BLE) connection. The first electronic device is configured to establish the BR/EDR connection to the accessory device. The first electronic device is further configured to: when determining that the accessory device supports the dual-mode connection, disconnect the BR/EDR connection to the accessory device, and establish the BLE connection to the accessory device. The first electronic device is further configured to transmit audio data, video data, or call data with the accessory device through the BLE connection.

In embodiments of this application, when both the first electronic device and the accessory device support the dual-mode connection, the first electronic device may first establish the BR/EDR connection to the accessory device; and when determining that the accessory device supports the dual-mode connection, disconnect the BR/EDR connection to the accessory device, and establish the BLE connection to the accessory device. In addition, the first electronic device may further transmit the audio data, the video data, the call data, or the like to the accessory device through the BLE connection. This helps reduce power consumption of the electronic device.

In some possible implementations, the first electronic device may query capability information of the accessory device after establishing the BR/EDR connection to the accessory device. After the BR/EDR connection is established, the first electronic device may transmit the call data through a synchronous connection-oriented/extended (synchronous connection-oriented/extended, SCO) link or an extended synchronous connection-oriented (extended synchronous connection-oriented, eSCO) link, and transmit the audio data or the video data through an ACL link.

In some possible implementations, in the BLE connection, the first electronic device may transmit the call data, the audio data, or the video data with the accessory device through an isochronous channel (isochronous channel, ISO).

With reference to the first aspect, in some implementations of the first aspect, the first electronic device is specifically configured to establish an asynchronous link ACL in the BR/EDR connection to the accessory device. The first electronic device is further configured to send inquiry request information to the accessory device through the ACL, where the inquiry request information is used to query whether the accessory device supports the dual-mode connection. The first electronic device is further configured to receive inquiry response information sent by the accessory device, where the inquiry response information is used to indicate that the accessory device supports the dual-mode connection.

In embodiments of this application, after the ACL in the BR/EDR connection is established to the accessory device, the first electronic device may query the accessory device for the capability information of the accessory device, and does not need to query the capability information after the BR/EDR connection is completely established. This helps reduce a delay in establishing the BLE connection between the first electronic device and the accessory device.

With reference to the first aspect, in some implementations of the first aspect, the first electronic device is specifically configured to add the inquiry request information to an echo (echo) message.

In embodiments of this application, the first electronic device may add the inquiry request information to the echo message, to confirm a version supported by both parties. This ensures version compatibility.

In some possible implementations, the inquiry request information is carried in an echo request (echo request) message.

In some possible implementations, the inquiry response information is carried in an echo response (echo response) message.

With reference to the first aspect, in some implementations of the first aspect, the accessory device is a Bluetooth headset, the Bluetooth headset includes a first earbud and a second earbud, a media access control MAC address of the first earbud is a first address, a MAC address of the second earbud is a second address, the second address is a MAC address used when a primary earbud establishes a connection to the first electronic device, and the first electronic device is specifically configured to: when the first earbud is the primary earbud, establish the BR/EDR connection to the first earbud by using the second address; when determining that the Bluetooth headset supports the dual-mode connection, disconnect the BR/EDR connection to the first earbud; and establish the BLE connection to the first earbud by using the first address, and establish the BLE connection to the second earbud by using the second address.

In embodiments of this application, the Bluetooth headset may statically configure the second MAC address as the MAC address used when the first electronic device establishes the connection to the primary earbud. When the first electronic device establishes the BR/EDR connection to the Bluetooth headset, the Bluetooth headset may further dynamically change the primary earbud. When the left earbud is the primary earbud, the left earbud establishes the BR/EDR connection to the first electronic device by using the second MAC address, and the right earbud may listen to a link between the left earbud and the first electronic device. When the first electronic device establishes the BLE connection to the Bluetooth headset, the left earbud may establish the BLE connection to the first electronic device by using the first MAC address, and the right earbud may establish the BLE connection to the first electronic device by using the second MAC address.

With reference to the first aspect, in some implementations of the first aspect, the first electronic device is further configured to: when the primary earbud is switched from the first earbud to the second earbud, establish the BLE connection to the first earbud by using the first address, and establish the BLE connection to the second earbud by using the second address.

In embodiments of this application, when the electronic device establishes the BLE connection to the Bluetooth headset, regardless of a change in the primary earbud, the left earbud uses a real MAC address (the first address) of the left earbud to establish the connection to the electronic device, and the right earbud uses a real MAC address (the second address) of the right earbud to establish the connection to the electronic device.

With reference to the first aspect, in some implementations of the first aspect, the system further includes a second electronic device, where the second electronic device supports only the BR/EDR connection. The Bluetooth headset is configured to: disconnect the BLE connection between the first earbud and the first electronic device, and disconnect the BLE connection between the second earbud and the first electronic device. The second electronic device is configured to: when the first earbud is the primary earbud, establish the BR/EDR connection to the first earbud by using the second address. The second electronic device is further configured to: when the primary earbud is switched from the first earbud to the second earbud, establish the BR/EDR connection to the second earbud by using the second address.

In embodiments of this application, if the second electronic device supports only the BR/EDR connection, when the left earbud is the primary earbud, the left earbud establishes the BR/EDR connection to the second electronic device by using the second MAC address, and the right earbud may listen to a link between the left earbud and the second electronic device. When the right earbud is the primary earbud, the right earbud establishes the BR/EDR connection to the second electronic device by using the second MAC address, and the left earbud may listen to a link between the right earbud and the second electronic device. A difference between the BR/EDR connection and the BLE connection is that, in the BR/EDR connection, regardless of whether the left earbud or the right earbud is the primary earbud, the primary earbud establishes the BR/EDR connection to the electronic device by using a same MAC address. However, in a BLE mode, regardless of whether the left earbud or the right earbud is the primary earbud, the left earbud establishes the BLE connection to the electronic device by using a real MAC address of the left earbud, and the right earbud establishes the BLE connection to the electronic device by using a real MAC address of the right earbud.

According to a second aspect, a Bluetooth connection method is provided. The method is applied to an electronic device, the electronic device supports a dual-mode connection, the dual-mode connection includes a BR/EDR connection and a BLE connection, and the method includes: The electronic device establishes the BR/EDR connection to the accessory device. When determining that the accessory device supports the dual-mode connection, the electronic device disconnects the BR/EDR connection to the accessory device, and establishes the BLE connection to the accessory device. The electronic device transmits audio data, video data, or call data with the accessory device through the BLE connection.

In embodiments of this application, when both the electronic device and the accessory device support the dual-mode connection, the electronic device may first establish the BR/EDR connection to the accessory device; and when determining that the accessory device supports the dual-mode connection, disconnect the BR/EDR connection to the accessory device, and establish the BLE connection to the accessory device. In addition, the electronic device may further transmit the audio data, the video data, the call data, or the like to the accessory device through the BLE connection. This helps reduce power consumption of the electronic device.

In some possible implementations, the electronic device may query capability information of the accessory device after establishing the BR/EDR connection to the accessory device. After the BR/EDR connection is established, the electronic device may transmit the call data over an SCO link or an eSCO link, and transmit the audio data or the video data over an ACL.

In some possible implementations, in the BLE connection, the electronic device may transmit the call data, the audio data, or the video data with the accessory device through an ISO.

With reference to the second aspect, in some implementations of the second aspect, before that the electronic device disconnects the BR/EDR connection to the accessory device, the method includes: The electronic device sends inquiry request information to the accessory device through an ACL in the BR/EDR connection established to the accessory device, where the inquiry request information is used to query whether the accessory device supports the dual-mode connection. The electronic device receives inquiry response information sent by the accessory device, where the inquiry response information is used to indicate that the accessory device supports the dual-mode connection.

In embodiments of this application, after the ACL in the BR/EDR connection is established to the accessory device, the electronic device may query the accessory device for the capability information of the accessory device, and does not need to query the capability information after the BR/EDR connection is completely established. This helps reduce a delay in establishing the BLE connection between the electronic device and the accessory device.

With reference to the second aspect, in some implementations of the second aspect, the sending inquiry request information to the accessory device includes: The electronic device sends an echo message to the accessory device, and adds the inquiry request information to the echo message.

In embodiments of this application, the electronic device may add the inquiry request information to the echo message, to confirm a version supported by both parties. This ensures version compatibility.

With reference to the second aspect, in some implementations of the second aspect, the accessory device is a Bluetooth headset, the Bluetooth headset includes a first earbud and a second earbud, a media access control MAC address of the first earbud is a first address, a MAC address of the second earbud is a second address, the second address is a MAC address used when a primary earbud establishes a connection to the electronic device, and that the electronic device establishes the BR/EDR connection to the accessory device includes: When the first earbud is the primary earbud, the electronic device establishes the BR/EDR connection to the first earbud by using the second address. When the primary earbud is switched from the first earbud to the second earbud, the electronic device establishes the BR/EDR connection to the second earbud by using the second address.

In embodiments of this application, regardless of whether the left earbud or the right earbud is the primary earbud, the electronic device establishes the BR/EDR connection to the primary earbud by using the second address.

With reference to the second aspect, in some implementations of the second aspect, that the electronic device establishes the BLE connection to the first earbud, and the electronic device establishes the BLE connection to the second earbud includes: When the first earbud is the primary earbud, the electronic device establishes the BLE connection to the first earbud by using the first address, and the electronic device establishes the BLE connection to the second earbud by using the second address. When the primary earbud is switched from the first earbud to the second earbud, the electronic device establishes the BLE connection to the first earbud by using the first address, and the electronic device establishes the BLE connection to the second earbud by using the second address.

A difference between the BR/EDR connection and the BLE connection is that, in the BR/EDR connection, regardless of whether the left earbud or the right earbud is the primary earbud, the primary earbud establishes the BR/EDR connection to the electronic device by using a same MAC address. However, in a BLE mode, regardless of whether the left earbud or the right earbud is the primary earbud, the left earbud establishes the BLE connection to the electronic device by using a real MAC address of the left earbud, and the right earbud establishes the BLE connection to the electronic device by using a real MAC address of the right earbud.

In embodiments of this application, in a case that both the electronic device and the accessory device support the dual-mode connection, the electronic device and the accessory device may first establish the BR/EDR connection. In the BR/EDR connection, the electronic device may query whether the accessory device supports the dual-mode connection. In the case that both the electronic device and the accessory device support the dual-mode connection, the electronic device may disconnect the BR/EDR connection to the accessory device, establish the BLE connection to the accessory device, and transmit the audio data, the video data, or the call data through the BLE connection. This helps reduce power consumption of the electronic device.

According to a third aspect, a Bluetooth connection method is provided. The method is applied to an accessory device, the accessory device supports a dual-mode connection, the dual-mode connection includes a basic rate/enhanced data rate BR/EDR connection and a Bluetooth low energy BLE connection, and the method includes: The accessory device establishes the BR/EDR connection to an electronic device. The accessory device sends indication information to the electronic device, where the indication information is used to indicate that the accessory device supports the dual-mode connection. The accessory device disconnects the BR/EDR connection to the electronic device, and establishes the BLE connection to the electronic device. The accessory device transmits audio data, video data, or call data with the electronic device through the BLE connection.

In embodiments of this application, when both the electronic device and the accessory device support the dual-mode connection, the accessory device may first establish the BR/EDR connection to the electronic device, and when the accessory device notifies the electronic device that the electronic device supports the dual-mode connection, the electronic device may disconnect the BR/EDR connection to the accessory device and establish the BLE connection to the accessory device. In addition, the electronic device may further transmit the audio data, the video data, the call data, or the like to the accessory device through the BLE connection. This helps reduce power consumption of the electronic device and the accessory device.

In some possible implementations, the electronic device may query capability information of the accessory device after establishing the BR/EDR connection to the accessory device. After the BR/EDR connection is established, the electronic device may transmit the call data over an SCO link or an eSCO link, and transmit the audio data or the video data over an ACL.

In some possible implementations, in the BLE connection, the electronic device may transmit the call data, the audio data, or the video data with the accessory device through an ISO.

With reference to the third aspect, in some implementations of the third aspect, that the accessory device sends indication information to the electronic device includes: The accessory device sends the indication information to the electronic device through an ACL after the accessory device establishes the ACL in the BR/EDR connection to the electronic device.

With reference to the third aspect, in some implementations of the third aspect, the accessory device is a Bluetooth headset, the Bluetooth headset includes a first earbud and a second earbud, a media access control MAC address of the first earbud is a first address, a MAC address of the second earbud is a second address, the second address is a MAC address used when a primary earbud establishes a connection to the electronic device, and that the accessory device establishes the BR/EDR connection to an electronic device includes: When the first earbud is the primary earbud, the first earbud establishes the BR/EDR connection to the electronic device by using the second address. When the primary earbud is switched from the first earbud to the second earbud, the second earbud establishes the BR/EDR connection to the electronic device by using the second address.

With reference to the third aspect, in some implementations of the third aspect, that the accessory device establishes the BLE connection to the electronic device includes: When the first earbud is the primary earbud, the first earbud establishes the BLE connection to the electronic device by using the first address, and the second earbud establishes the BLE connection to the electronic device by using the second address. When the primary earbud is switched from the first earbud to the second earbud, the first earbud establishes the BLE connection to the electronic device by using the first address, and the second earbud establishes the BLE connection to the electronic device by using the second address.

According to a fourth aspect, an apparatus is provided. The apparatus is included in an electronic device, and the apparatus has a function of implementing behavior of the electronic device in the foregoing aspects and the possible implementations of the foregoing aspects. The function may be implemented by hardware, or may be implemented by hardware executing corresponding software. The hardware or the software includes one or more modules or units corresponding to the foregoing function.

According to a fifth aspect, an apparatus is provided. The apparatus is included in an accessory device, and the apparatus has a function of implementing behavior of the accessory device in the foregoing aspects and the possible implementations of the foregoing aspects. The function may be implemented by hardware, or may be implemented by hardware executing corresponding software. The hardware or the software includes one or more modules or units corresponding to the foregoing function.

According to a sixth aspect, an electronic device is provided, including a Bluetooth chip, one or more processors, a memory, and one or more computer programs. The Bluetooth chip supports a BR/EDR connection and a BLE connection. The one or more computer programs are stored in the memory, and the one or more computer programs include instructions. When the instructions are executed by the electronic device, the electronic device is enabled to perform the Bluetooth connection method in the possible implementations of the second aspect.

According to a seventh aspect, an accessory device is provided, including a Bluetooth chip, one or more processors, a memory, and one or more computer programs. The Bluetooth chip supports a BR/EDR connection and a BLE connection. The one or more computer programs are stored in the memory, and the one or more computer programs include instructions. When the instructions are executed by the accessory device, the accessory device is enabled to perform the Bluetooth connection method in the possible implementations of the third aspect.

According to an eighth aspect, a chip system is provided, and is disposed in an electronic device. The chip system includes a Bluetooth chip and a processor, and the Bluetooth chip supports a BR/EDR connection and a BLE connection. The Bluetooth chip is configured to establish the BR/EDR connection to the accessory device. The processor is configured to determine that the accessory device supports a dual-mode connection. The Bluetooth chip is further configured to: disconnect the BR/EDR connection to the accessory device, and establish the BLE connection to the accessory device.

In some possible implementations, the Bluetooth chip specifically configured to establish an ACL in the BR/EDR connection to the accessory device. The Bluetooth chip is further configured to send inquiry request information to the accessory device through the ACL, where the inquiry request information is used to query whether the accessory device supports the dual-mode connection. The Bluetooth chip is further configured to receive inquiry response information sent by the accessory device, where the inquiry response information is used to indicate that the accessory device supports the dual-mode connection.

In some possible implementations, the Bluetooth chip is specifically configured to send the inquiry request information to the accessory device by using a logical link control and adaptation protocol L2CAP echo (echo) message.

In some possible implementations, the accessory device is a Bluetooth headset, the Bluetooth headset includes a first earbud and a second earbud, a media access control MAC address of the first earbud is a first address, a MAC address of the second earbud is a second address, the second address is a MAC address used when a primary earbud establishes a connection to the first electronic device, and the Bluetooth chip is specifically configured to: when the processor determines that the first earbud is the primary earbud, establish the BR/EDR connection to the accessory device by using the second address; and when the processor determines that the primary earbud is switched from the first earbud to the second earbud, establish the BR/EDR connection to the accessory device by using the second address.

In some possible implementations, the Bluetooth chip is specifically configured to: when the processor determines that the first earbud is the primary earbud, establish the BLE connection to the first earbud by using the first address, and establish the BLE connection to the second earbud by using the second address; or when the processor determines that the primary earbud is switched from the first earbud to the second earbud, establish the BLE connection to the first earbud by using the first address, and establish the BLE connection to the second earbud by using the second address.

According to a ninth aspect, a chip system is provided, and is disposed in an accessory device. The chip system includes a Bluetooth chip and a processor, and the Bluetooth chip supports a BR/EDR connection and a BLE connection. The Bluetooth chip is configured to establish the BR/EDR connection to an electronic device. The Bluetooth chip is further configured to indicate to the electronic device that the accessory device supports a dual-mode connection. The Bluetooth chip is further configured to: disconnect the BR/EDR connection to the electronic device, and establish the BLE connection to the electronic device.

In some possible implementations, the accessory device is a Bluetooth headset, the Bluetooth headset includes a first earbud and a second earbud, a media access control MAC address of the first earbud is a first address, a MAC address of the second earbud is a second address, the second address is a MAC address used when a primary earbud establishes a connection to the electronic device, and the accessory device establishes the BR/EDR connection to the electronic device. The Bluetooth chip is configured to: when the processor determines that the first earbud is the primary earbud, establish the BR/EDR connection to the electronic device by using the second address; and when the processor determines that the primary earbud is switched from the first earbud to the second earbud, establish the BR/EDR connection to the electronic device by using the second address.

In some possible implementations, the Bluetooth chip is specifically configured to: when the processor determines that the first earbud is the primary earbud, establish the BLE connection to the electronic device by using the first address, and establish the BLE connection to the electronic device by using the second address; or when the processor determines that the primary earbud is switched from the first earbud to the second earbud, establish the BLE connection to the electronic device by using the first address, and establish the BLE connection to the electronic device by using the second address.

According to a tenth aspect, this technical solution provides a computer-readable storage medium, including computer instructions. When the computer instructions are run on an electronic device, the electronic device is enabled to perform the Bluetooth connection method in any one of the foregoing aspects and the possible implementations of the foregoing aspects.

According to an eleventh aspect, this technical solution provides a computer program product. When the computer program product runs on an electronic device, the electronic device is enabled to perform the Bluetooth connection method in any one of the foregoing aspects and the possible designs of the foregoing aspects.

BRIEF DESCRIPTION OF DRAWINGS

FIG. 10A to FIG. 10D are a schematic flowchart of a method for performing Bluetooth pairing and connection between a mobile phone and a Bluetooth headset according to an embodiment of this application.

DESCRIPTION OF EMBODIMENTS

Terms used in the following embodiments are merely intended to describe particular embodiments, but are not intended to limit this application. Terms "one", "a" and "this" of singular forms used in this specification and the appended claims of this application are also intended to include expressions such as "one or more", unless otherwise specified in the context clearly. It should be further understood that, in the following embodiments of this application, "at least one" or "one or more" means one, two, or more. The term "and/or" is used to describe an association relationship between associated objects and represents that three relationships may exist. For example, A and/or B may represent the following three cases: Only A exists, both A and B exist, and only B exists, where A and B may be singular or plural. The character "/" generally represents an "or" relationship between the associated objects.

Reference to "an embodiment", "some embodiments", or the like described in this specification means that one or more embodiments of this application include a specific feature, structure, or characteristic described with reference to the embodiments. Therefore, statements such as "in an embodiment", "in some embodiments", "in some other embodiments", and "in other embodiments", that appear at different places in this specification do not necessarily mean referring to a same embodiment, instead, they mean "one or more but not all of the embodiments", unless otherwise specifically emphasized. Terms "include", "comprise", "have", and their variants all mean "include but are not limited to", unless otherwise specifically emphasized.

The following describes an electronic device, a user interface used for the electronic device, and embodiments used for using the electronic device. In some embodiments, the electronic device may be a portable electronic device that further includes another function such as a personal digital assistant function and/or a music player function, for example, a mobile phone, a tablet computer, or a wearable electronic device (for example, a smartwatch or the like) having a wireless communications function. An example embodiment of the portable electronic device includes but is not limited to a portable electronic device provided with iOS®, Android®, Microsoft®, or another operating system. The portable electronic device may alternatively be another portable electronic device, for example a laptop (laptop) or the like. It should be further understood that, in some other embodiments, the foregoing electronic device may not be the portable electronic device but a desktop computer.

Figure 1:
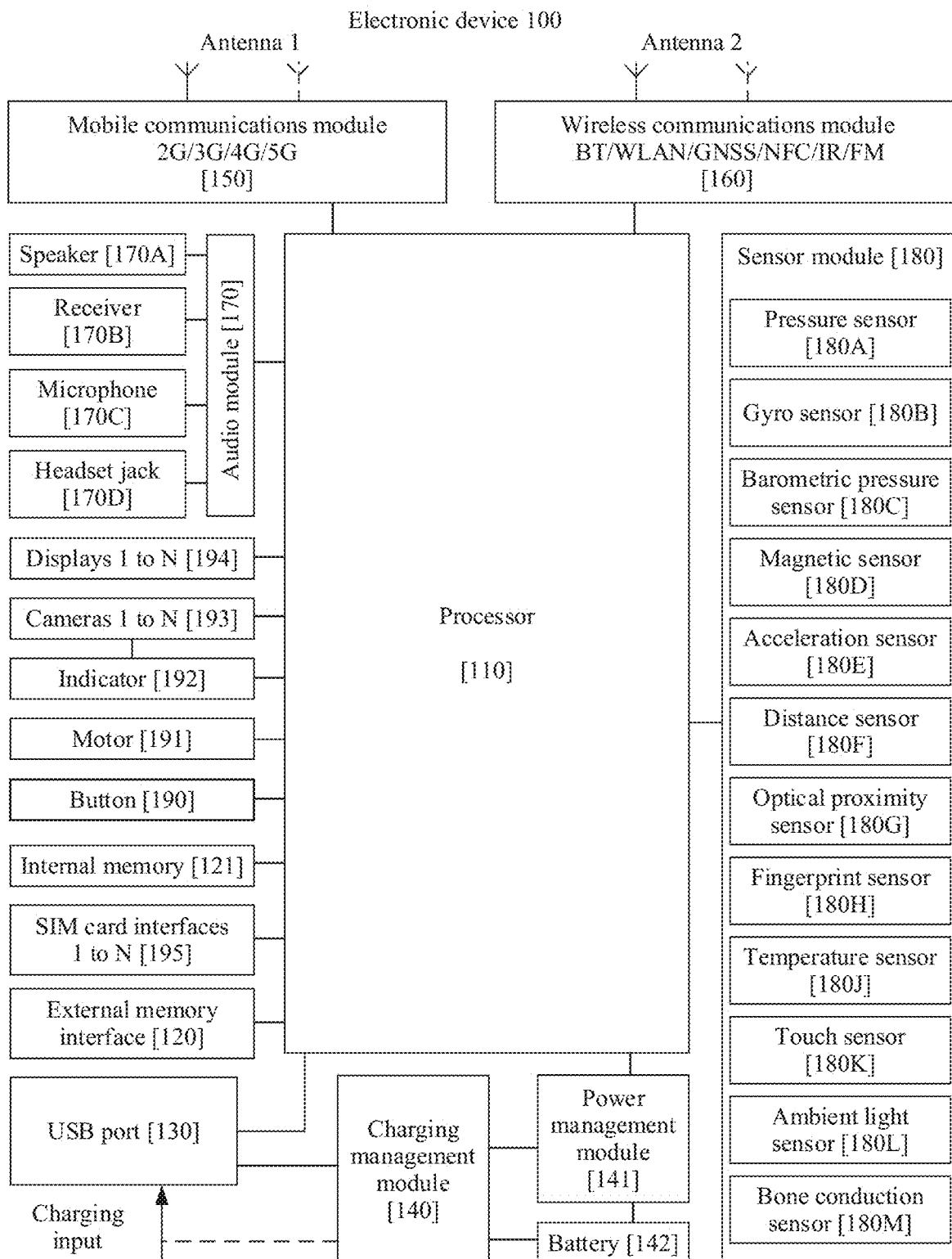
FIG. 1 is a schematic diagram of a structure of an electronic device according to an embodiment of this application.

For example, FIG. 1 is a schematic diagram of a structure of an electronic device 100. The electronic device 100 may include a processor 110, an external memory interface 120, an internal memory 121, a universal serial bus (universal serial bus, USB) port 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a compass 190, a motor 191, an indicator 192, a camera 193, a display 194, a subscriber identification module (subscriber identification module, SIM) card interface 195, and the like.

It may be understood that an example structure in this embodiment of this application does not constitute a specific limitation on the electronic device 100. In some other embodiments of this application, the electronic device 100 may include more or fewer components than those shown in the figure, or some components may be combined, or some components may be split, or there may be a different component layout. The components shown in the figure may be implemented by using hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be independent components, or may be integrated into one or more processors. In some embodiments, the electronic device 100 may alternatively include one or more processors 110. The controller may generate an operation control signal based on an instruction operation code and a time sequence signal, to complete control of instruction reading and instruction execution. In some other embodiments, a memory may be further disposed in the processor 110, to store instructions and data. For example, the memory in the processor 110 may be a cache memory. The memory may store instructions or data just used or cyclically used by the processor 110. If the processor 110 needs to use the instructions or the data again, the processor may directly invoke the instructions or the data from the memory. In this way, repeated access is avoided, waiting time of the processor 110 is reduced, and efficiency of processing data or executing instructions by the electronic device 101 is improved.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a SIM card interface and/or a USB interface, and the like. The USB port 130 is a port that conforms to a USB standard specification, and may be specifically a mini USB port, a micro USB port, a USB Type-C port, or the like. The USB port 130 may be configured to connect to a charger to charge the electronic device 101, or may be configured to transmit data between the electronic device 101 and a peripheral device. The USB port 130 may alternatively be configured to connect to a headset, to play audio by using the headset.

It may be understood that an interface connection relationship between modules illustrated in this embodiment of this application is merely an example for description, and does not constitute a limitation on the structure of the electronic device 100. In some other embodiments of this application, the electronic device 100 may alternatively use an interface connection mode different from that in the foregoing embodiment, or a combination of a plurality of interface connection modes.

The charging management module 140 is configured to receive a charging input from the charger. The charger may be a wireless charger or a wired charger. In some embodiments in which wired charging is used, the charging management module 140 may receive a charging input from the wired charger through the USB port 130. In some embodiments in which wireless charging is used, the charging management module 140 may receive a wireless charging input through a wireless charging coil of the electronic device 100. The charging management module 140 may further supply power to the electronic device by using the power management module 141 when the battery 142 is charged.

The power management module 141 is configured to connect to the battery 142, the charging management module 140, and the processor 110. The power management module 141 receives an input of the battery 142 and/or the charging management module 140, and supplies power to the processor 110, the internal memory 121, an external memory, the display 194, the camera 193, the wireless communications module 160, and the like. The power management module 141 may be further configured to monitor parameters such as a battery capacity, a quantity of battery cycles, and a battery state of health (leakage and impedance). In some other embodiments, the power management module 141 may alternatively be disposed in the processor 110. In some other embodiments, the power management module 141 and the charging management module 140 may alternatively be disposed in a same device.

A wireless communications function of the electronic device 100 may be implemented through the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the electronic device 100 may be configured to cover one or more communications frequency bands. Different antennas may be further multiplexed, to improve antenna utilization. For example, the antenna 1 may be multiplexed as a diversity antenna in a wireless local area network. In some other embodiments, an antenna may be used in combination with a tuning switch.

The mobile communications module 150 may provide a wireless communications solution that includes 2G/3G/4G/5G or the like and that is applied to the electronic device 100. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering or amplification on the received electromagnetic wave, and transmit a processed electromagnetic wave to the modem processor for demodulation. The mobile communications module 150 may further amplify a signal modulated by the modem processor, and convert the signal into an electromagnetic wave through the antenna 1 for radiation. In some embodiments, at least some function modules of the mobile communications module 150 may be disposed in the processor 110. In some embodiments, at least some function modules of the mobile communications module 150 and at least some modules of the processor 110 may be disposed in a same device.

The wireless communications module 160 may provide a wireless communications solution that includes a wireless local area network (wireless local area networks, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), near field communication (near field communication, NFC), an infrared (infrared, IR) technology, or the like and that is applied to the electronic device 100. The wireless communications module 160 may be one or more components that integrate at least one communications processor module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert a processed signal into an electromagnetic wave for radiation through the antenna 2.

The electronic device 100 implements a display function by using the GPU, the display 194, the application processor, and the like. The GPU is a microprocessor for image processing, and is connected to the display 194 and the application processor. The GPU is configured to: perform mathematical and geometric calculation, and render an image. The processor 110 may include one or more GPUs, which execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light-emitting diode (active-matrix organic light-emitting diode, AMOLED), a flexible light emitting diode (flexible light emitting diode, FLED), a mini light-emitting diode (mini light-emitting diode, miniLED), a microLED, a microOLED, quantum dot light emitting diodes (quantum dot light emitting diodes, QLED), or the like. In some embodiments, the electronic device 100 may include one or more displays 194.

In some embodiments of this application, when the display panel is made of a material such as the OLED, the AMOLED, or the FLED, the display 194 in FIG. 1 may be bent. Herein, that the display 194 may be bent means that the display may be bent to any angle at any part, and may be held at the angle. For example, the display 194 may be folded left and right from the middle. Alternatively, the display 194 may be folded up and down from the middle.

The display 194 of the electronic device 100 may be a flexible screen. Currently, the flexible screen attracts much attention due to unique features and huge potential of the flexible screen. Compared with a conventional screen, the flexible screen has features of strong flexibility and bendability, and can provide a user with a new interaction mode based on the feature of bendability, to meet more requirements of the user for an electronic device. For an electronic device configured with a foldable display, the foldable display on the electronic device may be switched between a small screen in a folded form and a large screen in an expanded form at any time. Therefore, the user uses a split-screen function more frequently on the electronic device provided with the foldable display.

The electronic device 100 can implement a photographing function by using the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and a skin color of the image. The ISP may further optimize parameters such as exposure and a color temperature of a shooting scenario. In some embodiments, the ISP may be disposed in the camera 193.

The camera 193 is configured to capture a static image or a video. An optical image of an object is generated through the lens, and is projected to the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format, for example, RGB or YUV. In some embodiments, the electronic device 100 may include one or more cameras 193.

The digital signal processor is configured to process a digital signal, and may process another digital signal in addition to the digital image signal. For example, when the electronic device 100 selects a frequency, the digital signal processor is configured to perform Fourier transform and the like on frequency energy.

The video codec is configured to: compress or decompress a digital video. The electronic device 100 may support one or more video codecs. Therefore, the electronic device 100 may play or record videos in a plurality of coding formats, for example, moving picture experts group (moving picture experts group, MPEG)-1, MPEG-2, MPEG-3, MPEG-4, and the like.

The NPU is a neural-network (neural-network, NN) computing processor. The NPU quickly processes input information by referring to a biological neural network structure, for example, by referring to a mode of transfer between human brain neurons, and may further continuously perform self-learning. Applications such as intelligent cognition of the electronic device 100, such as image recognition, facial recognition, speech recognition, and text understanding, can be implemented by using the NPU.

The external memory interface 120 may be configured to connect to an external storage card, for example, a micro SD card, to extend a storage capability of the electronic device 100. The external memory card communicates with the processor 110 through the external memory interface 120, to implement a data storage function. For example, files such as music and videos are stored in the external storage card.

The internal memory 121 may be configured to store one or more computer programs, and the one or more computer programs include instructions. The processor 110 may run the instructions stored in the internal memory 121, to enable the electronic device 101 to perform the Bluetooth pairing and connection method provided in some embodiments of this application, various applications, data processing, and the like. The internal memory 121 may include a program storage area and a data storage area. The program storage area may store an operating system. The program storage area may further store one or more applications (for example, Albums and Contacts), and the like. The data storage area may store data (for example, a photo and a contact) created during use of the electronic device 101, and the like. In addition, the internal memory 121 may include a high-speed random access memory, or may include a non-volatile memory, for example, one or more magnetic disk storage devices, flash memory devices, or universal flash storage (universal flash storage, UFS). In some embodiments, the processor 110 may run the instructions stored in the internal memory 121 and/or the instructions stored in the memory disposed in the processor 110, to enable the electronic device 101 to perform the Bluetooth pairing and connection method provided in embodiments of this application, and another application and data processing. The electronic device 100 can implement audio functions, for example, a music playing function and a recording function, by using the audio module 170, the speaker 170A, the receiver 170B, the microphone 170C, the headset jack 170D, the application processor, and the like.

The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K an ambient light sensor 180L, a bone conduction sensor 180M, and the like.

The pressure sensor 180A is configured to sense a pressure signal, and can convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The terminal 100 determines pressure strength based on a capacitance change. When a touch operation is performed on the display 194, the terminal 100 detects intensity of the touch operation by using the pressure sensor 180A. The terminal 100 may also calculate a touch position based on a detection signal of the pressure sensor 180A. In some embodiments, touch operations that are performed at a same touch position but have different touch operation strength may correspond to different operation instructions. For example, when a touch operation whose touch operation strength is less than a first pressure threshold is performed on a Messages icon, an instruction for viewing an SMS message is executed. When a touch operation whose touch operation strength is greater than or equal to the first pressure threshold is performed on a Messages icon, an instruction for creating an SMS message is executed.

The gyro sensor 180B may be configured to determine a moving posture of the terminal 100. In some embodiments, an angular velocity of the terminal 100 around three axes (namely, x-axis, y-axis, and z-axis) may be determined by using the gyro sensor 180B. The gyro sensor 180B may be configured to perform image stabilization during photographing. For example, when the shutter is opened, the gyro sensor 180B detects an angle at which the terminal 100 jitters, calculates, based on the angle, a distance for which a lens module needs to compensate, and allows the lens to cancel the jitter of the terminal 100 through reverse motion, to implement image stabilization. The gyro sensor 180B may be further used in a navigation scenario and a motion-sensing game scenario.

The barometric pressure sensor 180C is configured to measure barometric pressure. In some embodiments, the terminal 100 calculates an altitude by using a barometric pressure value measured by the barometric pressure sensor 1800, to assist positioning and navigation.

The magnetic sensor 180D includes a Hall sensor. The terminal 100 may detect opening and closing of a flip leather case by using the magnetic sensor 180D. In some embodiments, when the terminal 100 is a clamshell phone, the terminal 100 may detect opening and closing of a flip cover by using the magnetic sensor 180D. Further, a feature such as automatic unlocking upon opening of the flip cover is se based on a detected opening or closing state of the flip cover.

The acceleration sensor 180E may detect values of accelerations in all directions (usually three axes) of the terminal 100. When the terminal 100 is still, a value and a direction of gravity may be detected. The acceleration sensor 180E may be further configured to identify a terminal posture, and is applied to applications such as screen switching between landscape and portrait modes and a pedometer.

The distance sensor 180F is configured to measure a distance. The terminal 100 may measure a distance through infrared light or a laser. In some embodiments, the terminal 100 may use the distance sensor 180F to measure a distance, to implement fast focusing in a photographing scenario.

The optical proximity sensor 180G may include, for example, a light emitting diode (LED) and an optical detector, for example, a photodiode. The light emitting diode may be an infrared light emitting diode. The terminal 100 emits infrared light by using the light emitting diode. The terminal 100 detects infrared reflected light from a nearby object by using the photodiode. When sufficient reflected light is detected, it may be determined that there is an object near the terminal 100. When insufficient reflected light is detected, the terminal 100 may determine that there is no object near the terminal 100. The terminal 100 may detect, by using the optical proximity sensor 180G, that the terminal 100 held by the user is close to an ear for a call, to automatically turn off a screen to save power. The optical proximity sensor 180G may also be used in a leather case mode or a pocket mode to automatically unlock or lock the screen.

The ambient light sensor 180L is configured to sense ambient light brightness. The terminal 100 may adaptively adjust brightness of the display 194 based on the sensed ambient light brightness. The ambient light sensor 180L may also be configured to automatically adjust a white balance during photographing. The ambient light sensor 180L may also cooperate with the optical proximity sensor 180G to detect whether the terminal 100 is in a pocket to prevent a false touch.

The fingerprint sensor 180H is configured to collect a fingerprint. The terminal 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the terminal 100 executes a temperature processing policy by using a temperature detected by the temperature sensor 180J. For example, when the temperature reported by the temperature sensor 180J exceeds a threshold, the terminal 100 lowers performance of a processor located near the temperature sensor 180J, to reduce power consumption to implement thermal protection. In some other embodiments, when the temperature is lower than another threshold, the terminal 100 heats the battery 142 to prevent the terminal 100 from being shut down abnormally because of a low temperature. In some other embodiments, when the temperature is lower than still another threshold, the terminal 100 boosts an output voltage of the battery 142 to avoid abnormal shutdown caused by a low temperature.

The touch sensor 180K is also referred to as a "touch panel". The touch sensor 180K may be disposed on the display 194, and the touch sensor 180K and the display 194 form a touchscreen. The touch sensor 180K is configured to detect a touch operation performed on or near the touch sensor. The touch sensor may transfer the detected touch operation to the application processor to determine a type of a touch event. A visual output related to the touch operation may be provided on the display 194. In some other embodiments, the touch sensor 180K may also be disposed on a surface of the terminal 100 in a position different from a position of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a human pulse, and receive a blood pressure beating signal. In some embodiments, the bone conduction sensor 180M may alternatively be disposed in a headset, to obtain a bone conduction headset. The audio module 170 may obtain a voice signal through parsing based on the vibration signal that is of the vibration bone of the vocal part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The terminal 100 may receive a button input, and generate a button signal input related to a user setting and function control of the terminal 100.

The motor 191 may generate a vibration prompt. The motor 191 may be used for an incoming call vibration prompt, or may be used for a touch vibration feedback. For example, touch operations performed on different applications (for example, photographing and audio playing) may correspond to different vibration feedback effects. The motor 191 may also correspond to different vibration feedback effects for touch operations performed on different areas of the display 194. Different application scenarios (for example, a time reminder, information receiving, an alarm clock, a game) may also correspond to different vibration feedback effects. A touch vibration feedback effect may further be customized.

The indicator 192 may be an indicator lamp, and may be configured to indicate a charging status and a power change, or may be configured to indicate a message, a missed call, a notification, and the like.

Figure 2:
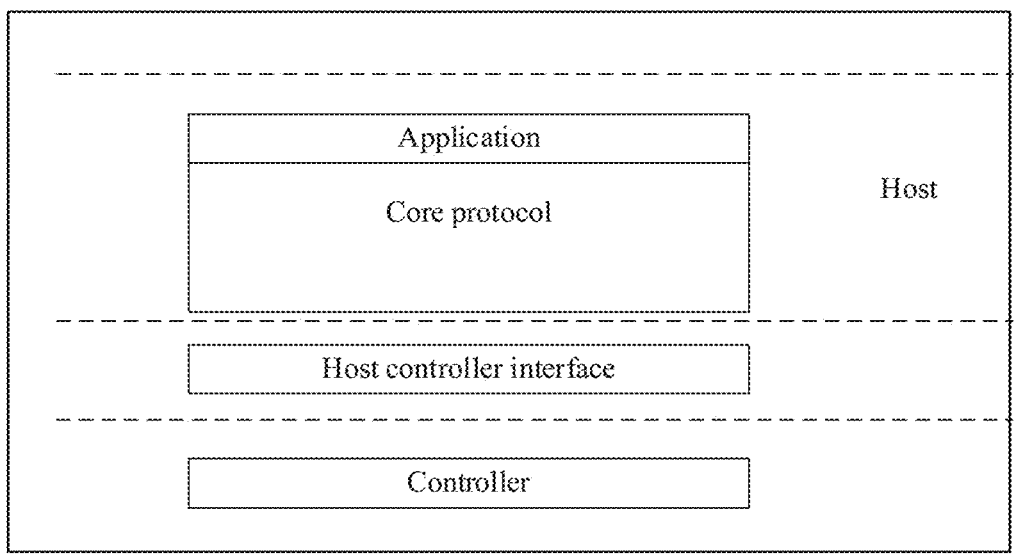
FIG. 2 is a schematic diagram of a Bluetooth protocol framework according to an embodiment of this application.

As shown in FIG. 2, an embodiment of this application provides a Bluetooth protocol framework, including but not limited to a host (host) protocol stack, a host controller interface (host controller interface, HCI), and a controller (controller).

The host protocol stack defines a plurality of profiles (profile) and a core protocol (protocol) in the Bluetooth framework. Each profile defines a corresponding message format and a corresponding application rule, and the profile is a Bluetooth application (application). To implement interconnection and interworking between different devices on different platforms, the Bluetooth protocol is a specification formulated for various possible and universal application scenarios, for example, a Bluetooth advanced audio distribution profile (advanced audio distribution profile, A2DP), a Bluetooth hands-free profile (hands-free profile, HFP), and the like. The core protocol includes but is not limited to a Bluetooth service discovery protocol (service discovery protocol, SDP), a logical link control and adaptation protocol (logical link control and adaptation protocol, L2CAP), and the like. The core protocol is essential to the Bluetooth stack.

The HCI provides, for upper-layer protocols, a unified interface for entering a link manager and a unified manner for entering a baseband. There are several transport layers between the host core protocol stack and the controller. These transport layers are transparent, and are used to complete data transmission. The Bluetooth special interest group (Bluetooth special interest group, SIG) specifies four physical bus modes, namely, four HCI transport layers: a USB, an RS232, a UART, and a PC card, used to connect to hardware.

The controller defines a bottom-layer hardware part, including a radio frequency (RF), a baseband (BB), and a link manager (LM). An RF layer filters and transmits data bit streams by using microwaves on a 2.4 GHz unlicensed ISM band, and mainly defines conditions that a Bluetooth transceiver needs to meet to work properly on this frequency band. The baseband is responsible for frequency hopping and transmission of Bluetooth data and information frames. The link manager is responsible for connection, establishment, and disconnection of links, and security control. A link manager (link manager, LM) layer is a link management layer protocol of the Bluetooth stack, and is responsible for translating an upper-layer HCI command into an operation that can be accepted by the baseband; establishing an asynchronous connection-oriented link (asynchronous connection-oriented link, ACL), a synchronous connection-oriented/extended (synchronous connection-oriented/extended, SCO) link, and an extended synchronous connection-oriented (extended synchronous connection-oriented, eSCO) link; enabling a Bluetooth device to enter an energy-saving working mode; and the like. A link control (link control, LC) layer is responsible for responding to an upper-layer LM command (for example, executing an LM command for establishing a transmission link of a data packet, maintaining a link, and the like) during transmission of a group of data packets.

In a BR/EDR connection, an electronic device and an accessory device use the SCO and the eSCO to transmit call data, and use the ACL link to transmit audio or video data.

In a BLE connection, an electronic device may transmit call data, audio data, or video data with an accessory device through an isochronous channel (isochronous channel, ISO).

Some content of the method described in this embodiment of this application is implemented by the wireless communications module 160 of the electronic device 100 shown in FIG. 1, and may be specifically performed by a Bluetooth module or a Bluetooth chip.

Figure 3:
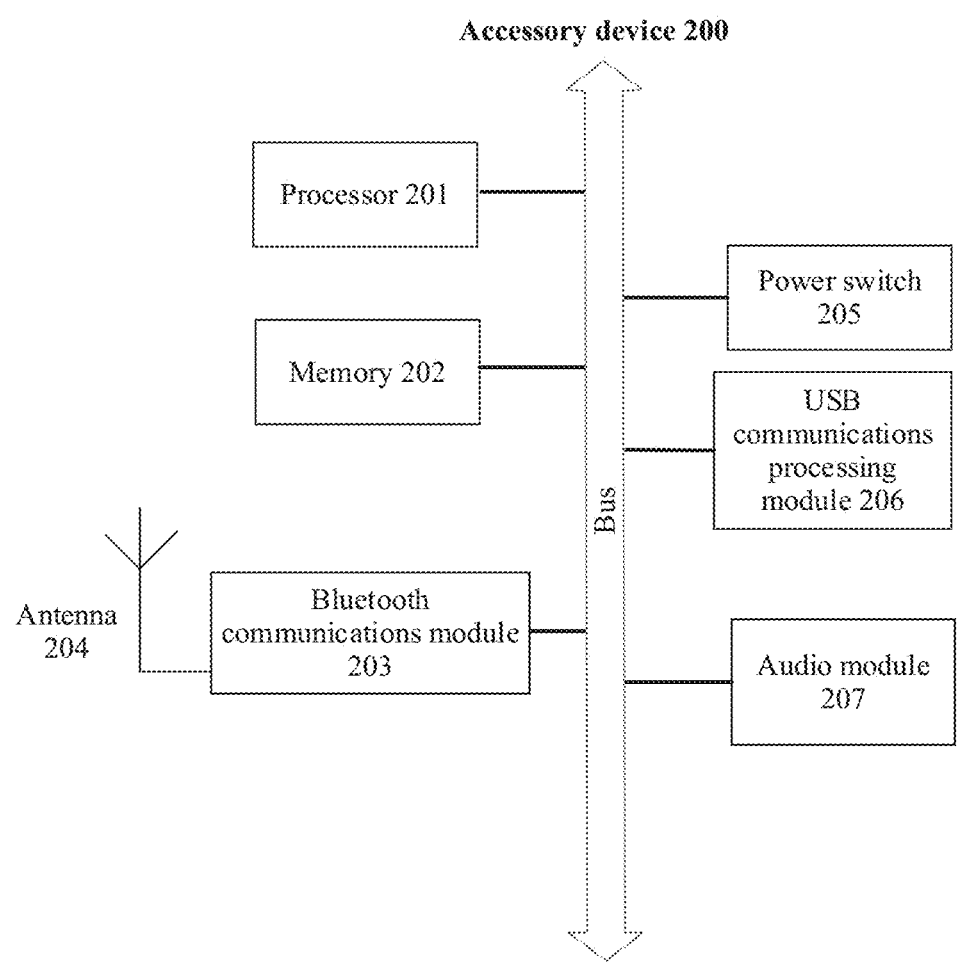
FIG. 3 is a schematic diagram of a structure of an accessory device according to an embodiment of this application.

FIG. 3 is a schematic diagram of an example of a structure of an accessory device 200 according to an embodiment of this application.

The following describes the embodiment in detail by using the accessory device 200 as an example. It should be understood that the accessory device 200 shown in FIG. 3 is merely an example, and the accessory device 200 may have more or fewer components than those shown in FIG. 3, may combine two or more components, or may have different component configurations. Various components shown in the figure may be implemented by using hardware including one or more signal processing and/or application-specific integrated circuits, software, or a combination of hardware and software.

As shown in FIG. 3, the accessory device 200 may include a processor 201, a memory 202, a Bluetooth communications module 203, an antenna 204, a power switch 205, a USB communications processing module 206, and an audio module 207.

The processor 201 may be configured to read and execute computer-readable instructions. During specific implementation, the processor 201 may mainly include a controller, a calculator, and a register. The controller is mainly responsible for decoding an instruction, and sends a control signal for an operation corresponding to the instruction. The calculator is mainly responsible for storing a register operand, an intermediate operation result, and the like that are temporarily stored during instruction execution. During specific implementation, a hardware architecture of the processor 201 may be an application-specific integrated circuit (ASIC) architecture, an MIPS architecture, an ARM architecture, an NP architecture, or the like.

In some embodiments, the processor 201 may be configured to parse a signal, for example, a pairing mode modification request sent by the electronic device 100, received by the Bluetooth communications processing module 203. The processor 201 may be configured to perform a corresponding processing operation based on a parsing result, for example, generate a pairing mode modification response.

The memory 202 is coupled to the processor 201, and is configured to store various software programs and/or a plurality of sets of instructions. During specific implementation, the memory 202 may include a high-speed random access memory, and may also include a non-volatile memory such as one or more disk storage devices, a flash device, or another non-volatile solid-state storage device. The memory 202 may store an operating system, for example, an embedded operating system such as uCOS, VxWorks, or RTLinux. The memory 202 may further store a communications program. The communications program may be used to communicate with the electronic device 100, one or more servers, or another device.

The Bluetooth communications module 203 may include a classic Bluetooth (BT) module and a Bluetooth low energy (Bluetooth low energy, BLE) module.

In some embodiments, the Bluetooth communications module 203 may listen to a signal, such as a detection request or a scanning signal, transmitted by another device (for example, the electronic device 100), and may send a response signal, a scanning response, or the like, to enable the another device (for example, the electronic device 100) to discover the accessory device 200; establish a wireless communications connection to the another device (for example, the electronic device 100); and communicate with the another device (for example, the electronic device 100) through Bluetooth.

In some other embodiments, the Bluetooth communications module 203 may also transmit a signal, for example, broadcast a BLE signal, to enable another device (for example, the electronic device 100) to discover the accessory device 200; establish a wireless communications connection to the another device (for example, the electronic device 100) and communicate with the another device (for example, the electronic device 100) through Bluetooth.

A wireless communications function of the accessory device 200 may be implemented through the antenna 204, the Bluetooth communications module 203, the modem processor, and the like.

The antenna 204 may be configured to transmit and receive electromagnetic wave signals. Each antenna in the accessory device 200 may be configured to cover one or more communications frequency bands.

In some embodiments, the Bluetooth communications module 203 may have one or more antennas.

The power switch 205 may be configured to control a power supply to supply power to the accessory device 200.

The USB communications processing module 206 may be configured to communicate with another device through a USB port (not shown).

The audio module 207 may be configured to output an audio signal through an audio output interface, to enable the accessory device 200 to support audio playing. The audio module may be further configured to receive audio data through an audio input interface. The accessory device 200 may be a media play device, for example, a Bluetooth headset.

In some embodiments, the accessory device 200 may further include a display (not shown). The display may be configured to display an image, prompt information, and the like. The display may be an LCD display, an OLED display, an AMOLED display, an FLED display, a QLED display, or the like.

In some embodiments, the accessory device 200 may further include a serial interface, for example, an RS-232 interface and the like. The serial interface may be connected to another device, for example, an audio loudspeaker device such as a sound box, to enable the accessory device 200 and the audio loudspeaker device to cooperatively play audio and a video.

It may be understood that the structure shown in FIG. 3 does not constitute a specific limitation on the accessory device 200. In some other embodiments of this application, the accessory device 200 may include more or fewer components than those shown in the figure, or some components may be combined, or some components may be split, or there may be a different component layout. The components shown in the figure may be implemented by using hardware, software, or a combination of software and hardware.

In the method described in embodiments of this application, for a Bluetooth protocol framework used by the accessory device, refer to FIG. 2. Details are not described herein again.

For ease of understanding, in the following embodiments of this application, a mobile phone having the structures shown in FIG. 1 and FIG. 2, and a Bluetooth headset shown in FIG. 3 are used as examples to describe in detail the Bluetooth pairing and connection method provided in embodiments of this application with reference to the accompanying drawings.

Figure 4A:
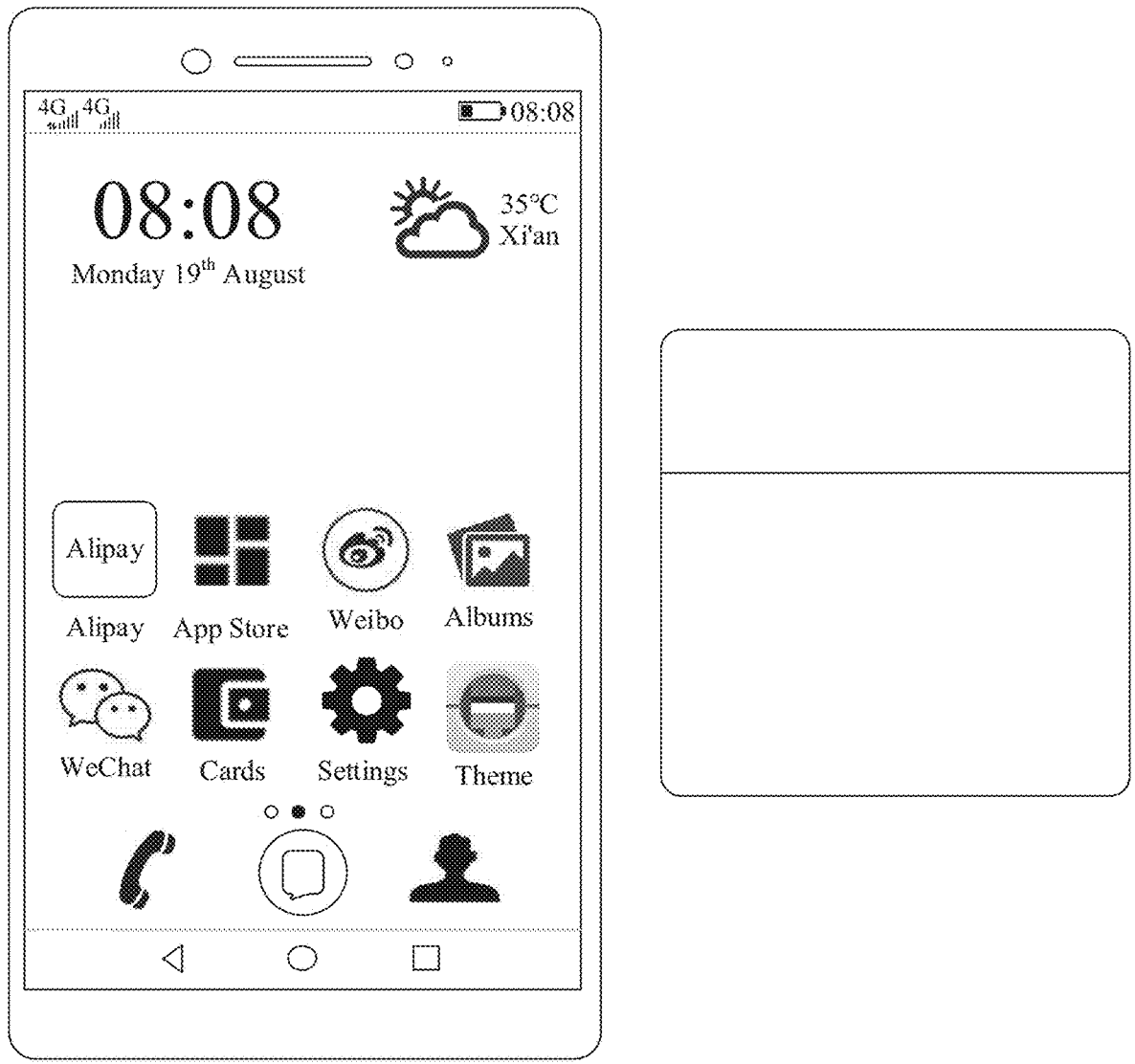
FIG. 4(a) and FIG. 4(b) are a group of GUIs according to an embodiment of this application.

FIG. 4(*a*) and FIG. 4(*b*) show a group of graphical user interfaces (graphical user interface, GUI) according to an embodiment of this application. FIG. 4(*a*) and FIG. 4(*b*) show a process in which a Bluetooth headset is connected to a mobile phone through proximity discovery.

Refer to FIG. 4(*a*). The mobile phone is in a screen-on state, and displays a home screen of the mobile phone. The home screen of the mobile phone includes applications (applications, APPS) such as an Alipay application, App Store, Weibo, Albums, WeChat, Cards, Settings, and Theme. The Bluetooth headset is placed in a headset case.

Refer to FIG. 4(*b*), when the Bluetooth headset detects that a user opens the headset case and approaches the mobile phone, the mobile phone automatically pops up a reminder box 401. The reminder box 401 may display a device name of the Bluetooth headset. After the mobile phone detects an operation of tapping a control 402 by the user, the mobile phone may pair with the Bluetooth headset.

Figure 5:
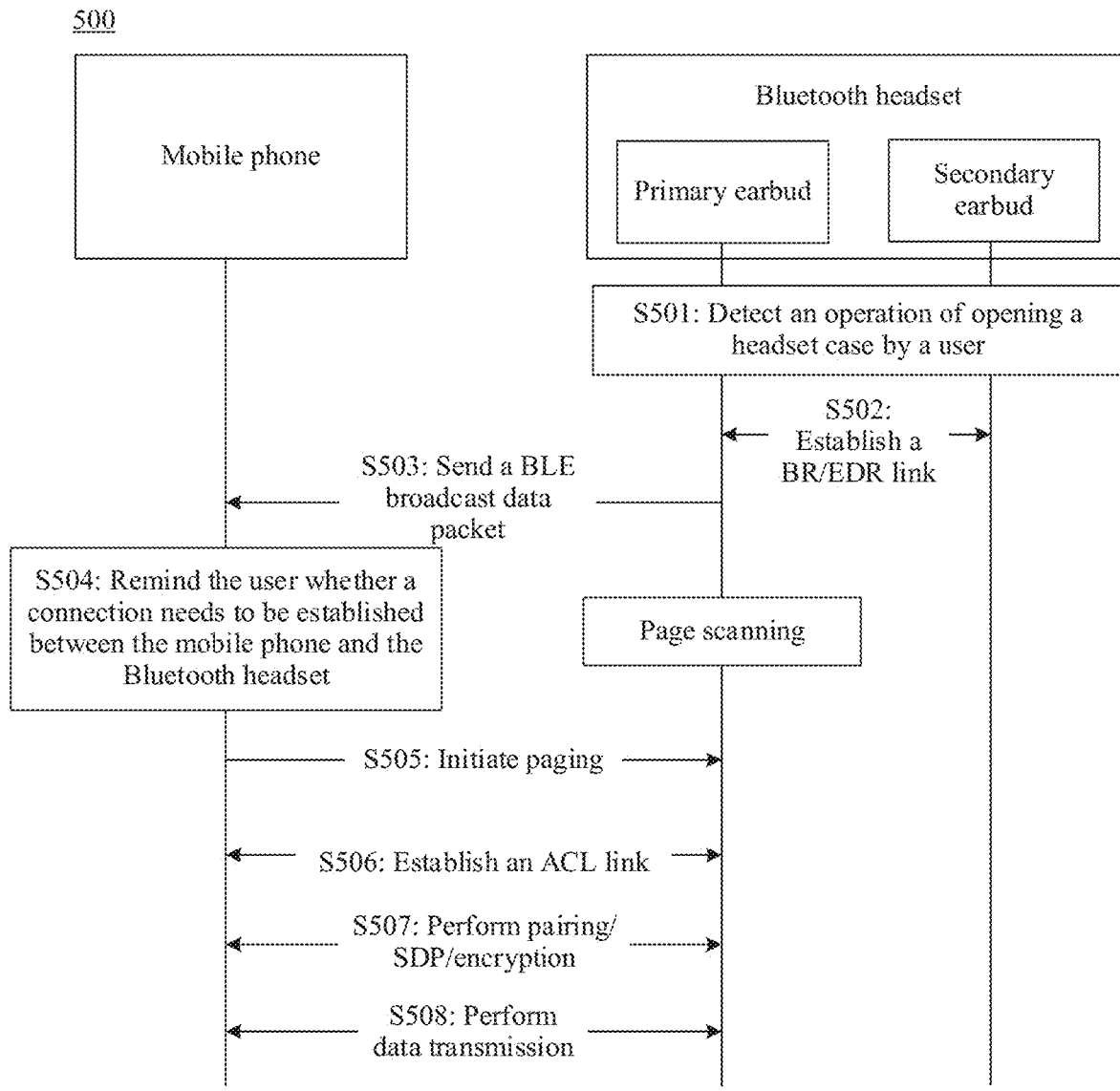
FIG. 5 is a schematic flowchart of a method for performing Bluetooth pairing and connection between a mobile phone and a Bluetooth headset according to an embodiment of this application.

FIG. 5 is a schematic flowchart of a method 500 for performing Bluetooth pairing and connection between a mobile phone and a Bluetooth headset according to an embodiment of this application. As shown in FIG. 5, the method 500 includes the following steps.

S501: The Bluetooth headset detects an operation of opening a headset case by a user.

S502: In response to the detected operation of opening the headset case by the user, first establish a basic rate (basic rate, BR)/enhanced data rate (enhanced data rate, EDR) link between a primary earbud and a secondary earbud (or first establish the BR/EDR link between a left earbud and a right earbud).

S503: The Bluetooth headset determines the primary earbud, and the primary earbud may send a BLE broadcast data packet to a surrounding device.

For example, the BLE broadcast data packet may carry a MAC address of the primary earbud and a device type of the Bluetooth headset.

It should be understood that the primary earbud may be determined according to a predefined rule in this embodiment of this application. The predefined rule may be a combination of static configuration and dynamic configuration.

For example, a MAC address of the left earbud of the Bluetooth headset is a MAC address 1, and a MAC address of the right earbud of the Bluetooth headset is a MAC address 2. Before the case of the Bluetooth headset is opened, the right earbud may be first statically configured as the primary earbud, and the BLE broadcast may carry the MAC address 2 and the device type of the Bluetooth headset. After receiving the BLE broadcast data packet, the mobile phone may learn, through parsing, that a MAC address in the BLE broadcast data packet is the MAC address 2, and the mobile phone always establishes the BR/EDR connection to the Bluetooth headset by using the MAC address 2.

After the Bluetooth headset detects the operation of opening the case by the user, the Bluetooth headset may dynamically configure a determining manner of the primary earbud.

For example, the Bluetooth headset may determine, based on positions of the left earbud and the right earbud, which earbud is the primary earbud and which earbud is the secondary earbud. When the Bluetooth headset detects that the left earbud is inserted into an ear of the user and the right earbud is not inserted into an ear of the user, the Bluetooth headset may determine that the left earbud is the primary earbud and the right earbud is the secondary earbud. In this case, the BR/EDR link has been established between the left earbud and the right earbud. To be specific, the left earbud knows the MAC address of the right earbud, and the right earbud also knows the MAC address of the left earbud. In this case, the left earbud may establish the BR/EDR link to the mobile phone by using the MAC address 2, and the right earbud may listen to the link between the mobile phone and the left earbud.

In a case in which both the left earbud and the right earbud are inserted into ears of the user, the Bluetooth headset may further determine, based on a battery level of the left earbud and a battery level of the right earbud, which earbud is the left earbud and which earbud is the right earbud. For example, when both the left earbud and the right earbud are inserted into the ears of the user, and the right earbud has a higher battery level than the left earbud, the Bluetooth headset may determine that the right earbud is the primary earbud and the left earbud is the secondary earbud. In this case, the right earbud may establish the BR/EDR link to the mobile phone by using the MAC address 2, and the left earbud may listen to (or monitor) the link between the mobile phone and the right earbud.

S504: After receiving the BLE broadcast data packet, the mobile phone displays the device type of the Bluetooth headset and reminds the user whether a connection needs to be established between the mobile phone and the Bluetooth headset.

Figure 4B:
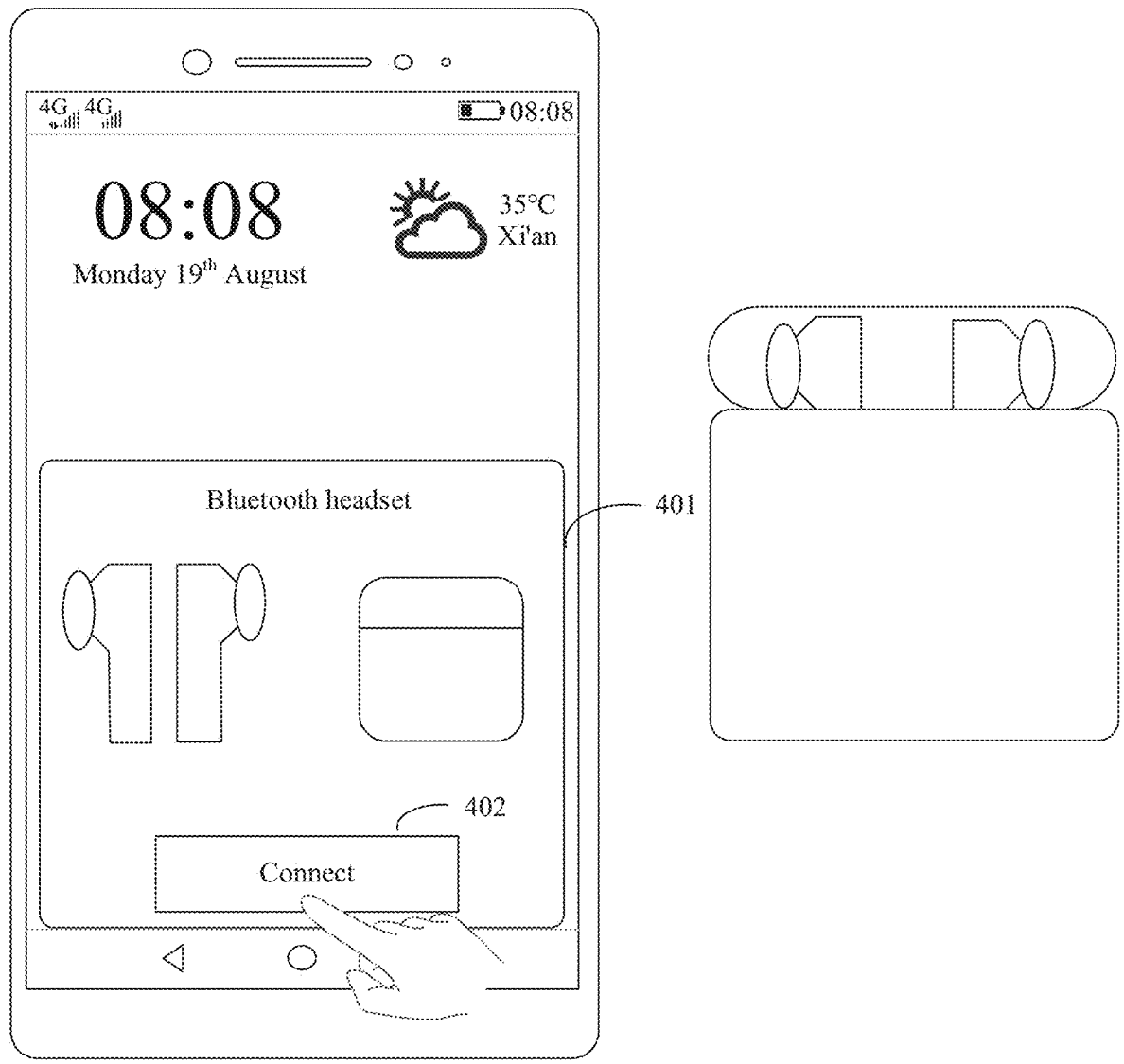

For example, as shown in FIG. 4(b), a display of the mobile phone may display the device type of the Bluetooth headset and the control 402.

S505: After the mobile phone detects an operation of tapping the control 402 by the user, the mobile phone may initiate paging (page) the MAC address 2.

S506: When being in page scanning (page scan), the Bluetooth headset receives paging sent by the mobile phone, and a (BR/EDR) ACL link is established between the mobile phone and the primary earbud.

S507: The mobile phone and the primary earbud perform a (BR/EDR) pairing/SDP/encryption process.

It should be understood that S505 and S506 may be understood as a process in which the mobile phone and the primary earbud perform standard Bluetooth pairing.

S508: The mobile phone and the primary earbud perform data transmission.

For example, when the mobile phone answers a call by using the Bluetooth headset, an HFP connection may be established between the mobile phone and the primary earbud.

For example, when the mobile phone listens to music and watches a video by using the Bluetooth headset, an A2DP connection may be established between the mobile phone and the primary earbud.

It should be understood that the connection established between the mobile phone and the Bluetooth headset is described by using an example in which the Bluetooth headset approaches and discovers the mobile phone. Alternatively, the mobile phone may actively search for the Bluetooth headset, to establish the connection to the Bluetooth headset.

It should be further understood that, the method 500 is a process in which the Bluetooth headset is connected to the mobile phone through proximity discovery in an initial connection process. When the user opens the headset case next time, the primary earbud may initiate paging based on a MAC address of the mobile phone. When the mobile phone is in page scanning, the mobile phone may perform a standard Bluetooth pairing process with the primary earbud, to establish the BR/EDR connection.

FIG. 6(a) to FIG. 6(g) are another group of GUIs according to an embodiment of this application.

The GUIs shown in FIG. 6(a) to FIG. 6(g) are described by using an example in which a mobile phone actively searches for a Bluetooth headset by detecting that a user enables a Bluetooth function.

Figure 6A:
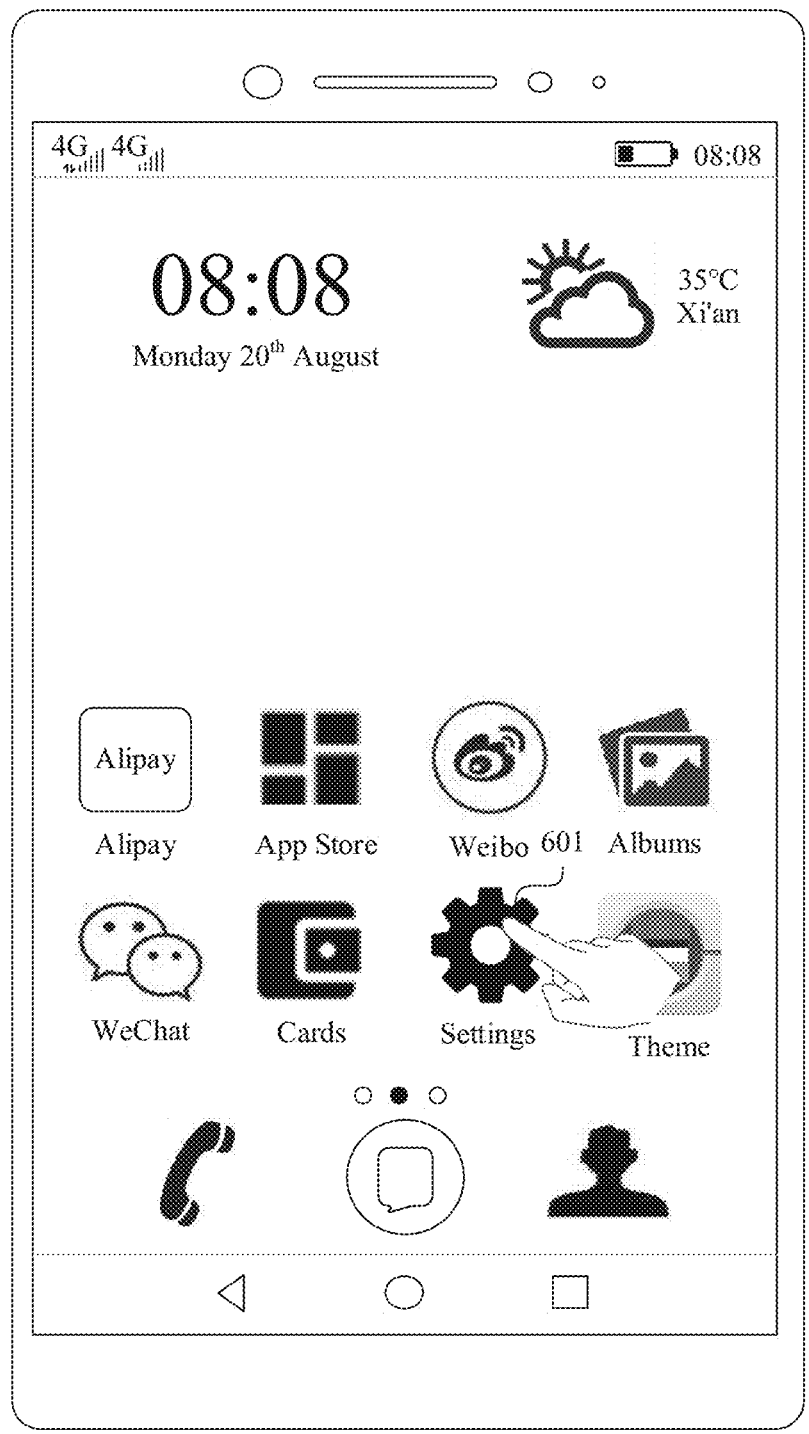
FIG. 6(a) to FIG. 6(g) are another group of GUIs according to an embodiment of this application.

Refer to FIG. 6(a). The GUI is a home screen of the mobile phone. The home screen of the mobile phone includes icons of a plurality of applications, and the icons of the plurality of applications include a Settings icon 601. After detecting an operation of tapping the icon 601 on the home screen by the user, the mobile phone may start to set a related function of the mobile phone, and display a GUI shown in FIG. 6(b).

Figure 6B:
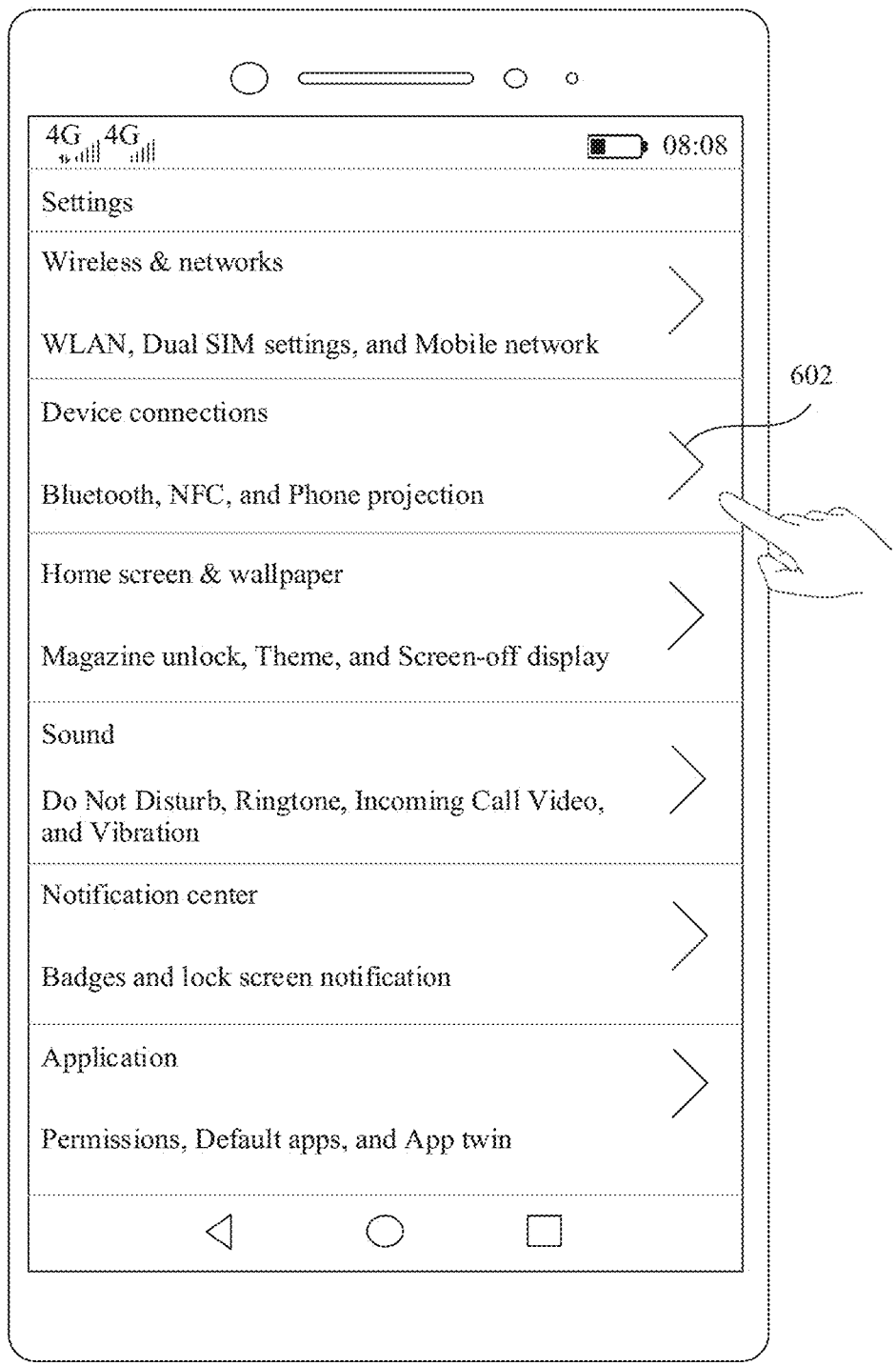

Refer to the GUI shown in FIG. 6(b). The GUI is a setting interface of the mobile phone. The GUI includes a plurality of function options. The plurality of function options include Wireless & networks, Device connections, Home screen & wallpaper, Sound, and the like. The user may set functions such as Bluetooth, NFC, and Phone projection by using a device connection function. After the mobile phone detects an operation of tapping a device connection function 602 by the user, the mobile phone opens a Bluetooth connection setting interface, and displays a GUI shown in FIG. 6(c).

Figure 6C:
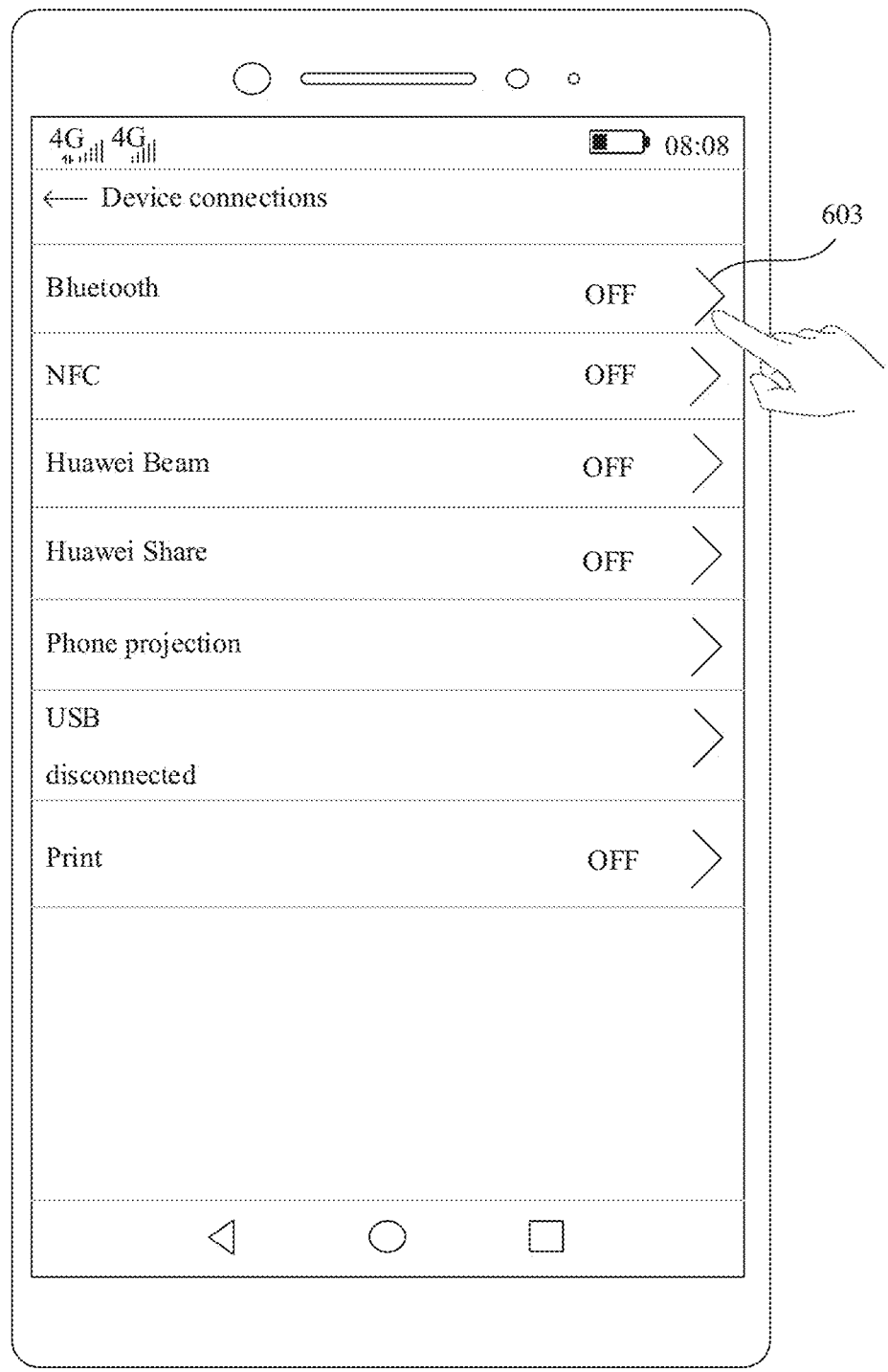
Figure 6D:
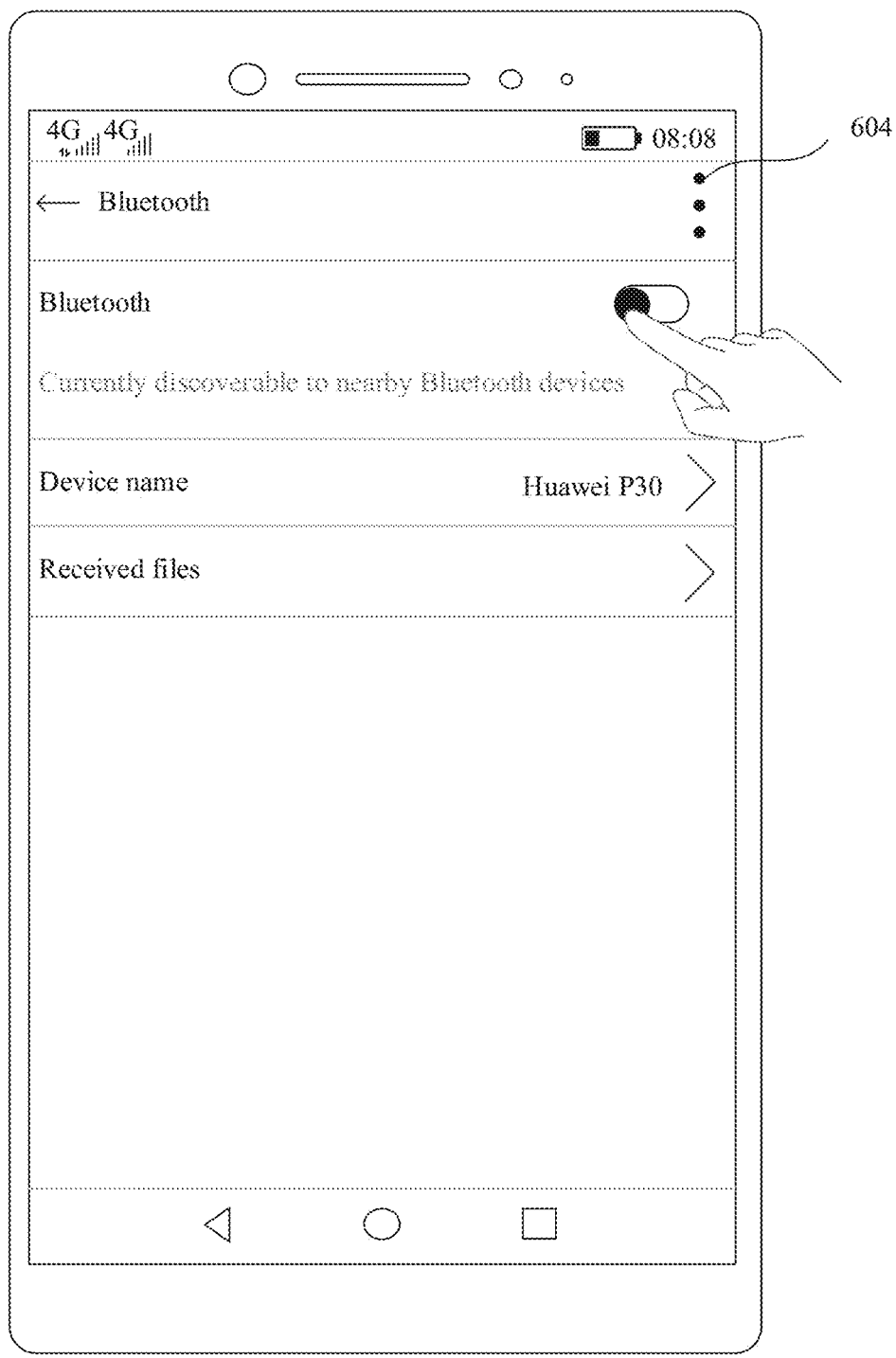
Figure 6E:
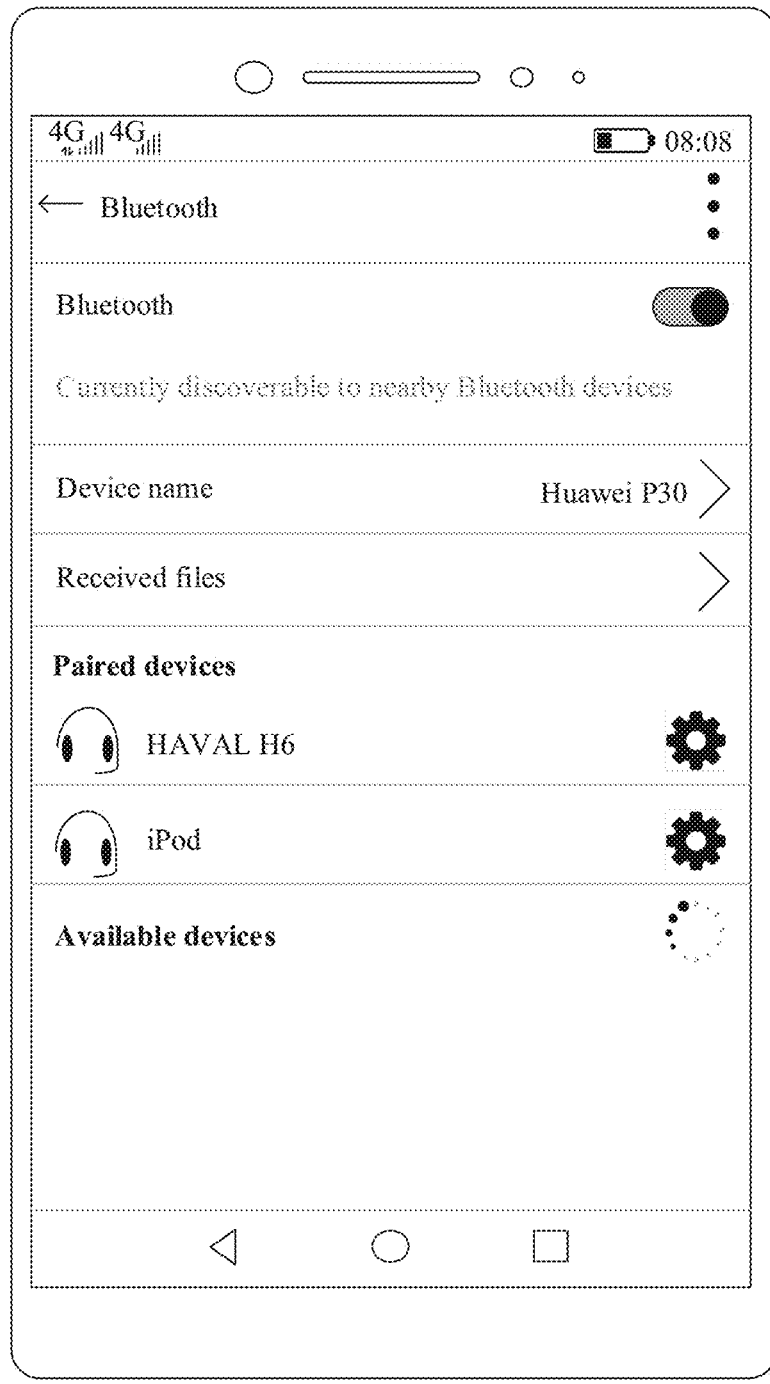

Refer to the GUI shown in FIG. 6(c). The GUI is a device connection setting interface of the mobile phone. The GUI includes a plurality of function options in Device connections, and the plurality of function options include device connection options such as Bluetooth, NFC, Huawei Beam, Huawei Share, and Phone projection. After the mobile phone detects an operation of tapping a Bluetooth function 603 by the user, the mobile phone may open a setting interface of the Bluetooth function, to display a GUI shown in FIG. 6(*d*).

Refer to the GUI shown in FIG. 6(*d*). The GUI is a Bluetooth settings interface. The Bluetooth setting interface includes functions such as a Bluetooth on/off control 604 and a device name "Huawei P30". After the mobile phone detects an operation of tapping the control 604 by the user, the mobile phone may enable a Bluetooth function, and may display in FIG. 6(*e*).

Refer to a GUI shown in FIG. 6(*e*). The GUI is a Bluetooth settings interface. The setting interface may display Paired devices and Available devices. A paired device may be a Bluetooth device previously connected to the mobile phone, and an available device may be a Bluetooth device found by the mobile phone.

Refer to a GUI shown in FIG. 6(*f*). The GUI is a Bluetooth settings interface. In the setting interface, Bluetooth devices found by the mobile phone may be displayed in Available devices, including a "Bluetooth headset" 605. After the mobile phone detects an operation of tapping the "Bluetooth headset" 605 by the user, the mobile phone may initiate paging to the Bluetooth headset based on a media access control (media access control, MAC) address of the Bluetooth headset, and display a GUI shown in FIG. 6(*g*).

Refer to a GUI shown in FIG. 6(*g*). The GUI is a Bluetooth settings interface. In the Bluetooth settings interface, a Bluetooth device named "Bluetooth headset" may be displayed in Paired devices to indicate that the Bluetooth device is connected to the mobile phone.

Figure 7:
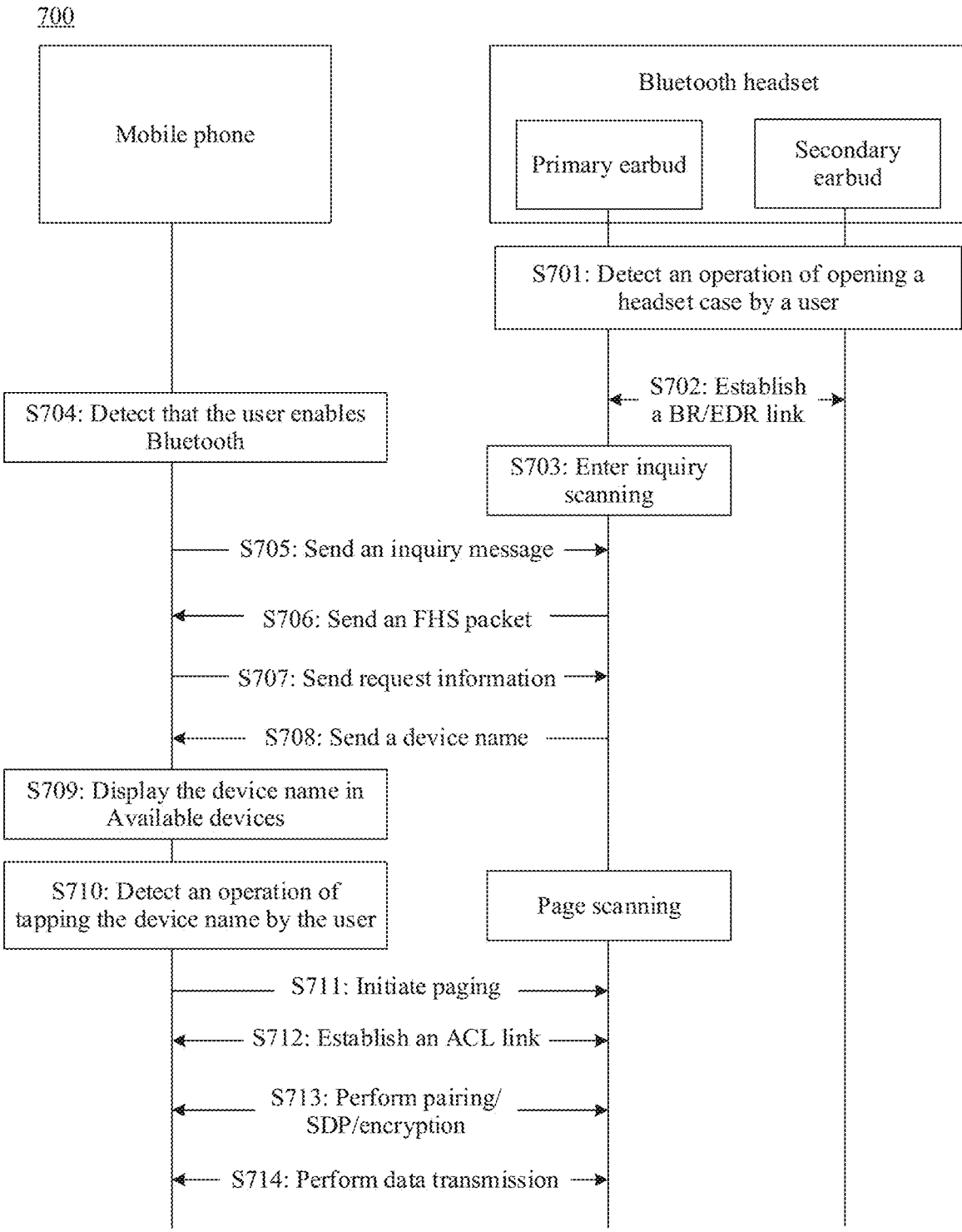
FIG. 7 is a schematic flowchart of a method for performing Bluetooth pairing and connection between a mobile phone and a Bluetooth headset according to an embodiment of this application.

FIG. 7 is a schematic flowchart of a method 700 for performing Bluetooth pairing and connection between a mobile phone and a Bluetooth headset according to an embodiment of this application. As shown in FIG. 7, the method 700 includes the following steps.

S701: The Bluetooth headset detects an operation of opening a headset case by a user.

S702: Establish a BR/EDR link between a left earbud and a right earbud in response to the operation of opening the headset case by the user.

S703: The Bluetooth headset detects that the user presses a function key on the headset case, and a primary earbud enters inquiry scanning (inquiry scan).

It should be understood that, after the mobile phone detects that the user presses the function key to enter a pairing mode, a host (host) sends an instruction to a controller (controller), to enable the controller to enter the pairing mode.

S704: The mobile phone detects that the user enables a Bluetooth function.

For example, as shown in FIG. 6(*c*), after the mobile phone detects the operation of tapping the Bluetooth function 603 by the user, the mobile phone enables Bluetooth.

S705: The mobile phone sends an inquiry (inquiry) message to a surrounding device.

S706: The primary earbud sends an FHS packet to the mobile phone in response to the inquiry sent by the mobile phone, where the FHS packet includes a MAC address of the primary earbud.

It should be understood that, for a process in which the primary earbud is determined, refer to the description in the method 500. For brevity, details are not described herein again.

S707: The mobile phone sends request information to the primary earbud for the MAC address in the FHS packet, where the request information is used to request a device name of the Bluetooth headset.

S708: The primary earbud sends the device name of the Bluetooth headset to the mobile phone in response to the request information.

S709: The mobile phone displays the device name of the Bluetooth headset in Available devices on a Bluetooth device search interface.

For example, as shown in FIG. 6(*f*), the device name of the Bluetooth headset may be "Bluetooth headset".

S710: The mobile phone detects an operation of tapping the "Bluetooth headset" by the user.

S711: In response to the operation of tapping the "Bluetooth headset" by the user, the mobile phone initiates paging (page) a MAC address of the Bluetooth headset.

S712: When the primary earbud is in a page scanning (page scan) state, after receiving paging sent by the mobile phone, establish an ACL link between the primary earbud and the mobile phone.

S713: The mobile phone and the primary earbud perform a (BR/EDR) pairing/SDP/encryption process.

It should be understood that S712 and S713 may be understood as a process in which the mobile phone and the primary earbud perform standard Bluetooth pairing.

S714: The mobile phone and the primary earbud perform data transmission.

For example, when the mobile phone answers a call by using the Bluetooth headset, an HFP connection may be established between the mobile phone and the primary earbud.

For example, when the mobile phone listens to music and watches a video by using the Bluetooth headset, an A2DP connection may be established between the mobile phone and the primary ear bud.

It should be understood that the method 700 describes a process in which the mobile phone actively searches for the Bluetooth headset and establishes the connection.

The foregoing describes a process in which the connection is established between the mobile phone and the Bluetooth headset with reference to the method 500 and the method 700. Currently, the connection established between the mobile phone and the Bluetooth headset may be a BR/EDR connection. To be specific, the BR/EDR connection is established between the mobile phone and only the primary earbud, and the secondary earbud may listen to (or monitor) the link between the mobile phone and the primary earbud.

For a mobile phone and a Bluetooth headset that support only a BR/EDR mode, the mobile phone and the Bluetooth headset may normally perform data transmission after establishing the BR/EDR connection. This embodiment of this application provides another connection mode of a BLE mode. A BR/EDR connection may be established between a mobile phone and a Bluetooth headset that support the BR/EDR connection and a BLE connection, and after a type and a capability of a peer device are identified, whether a subsequent connection is based on a BR/EDR mode or a BLE mode may be selected.

Figure 8:
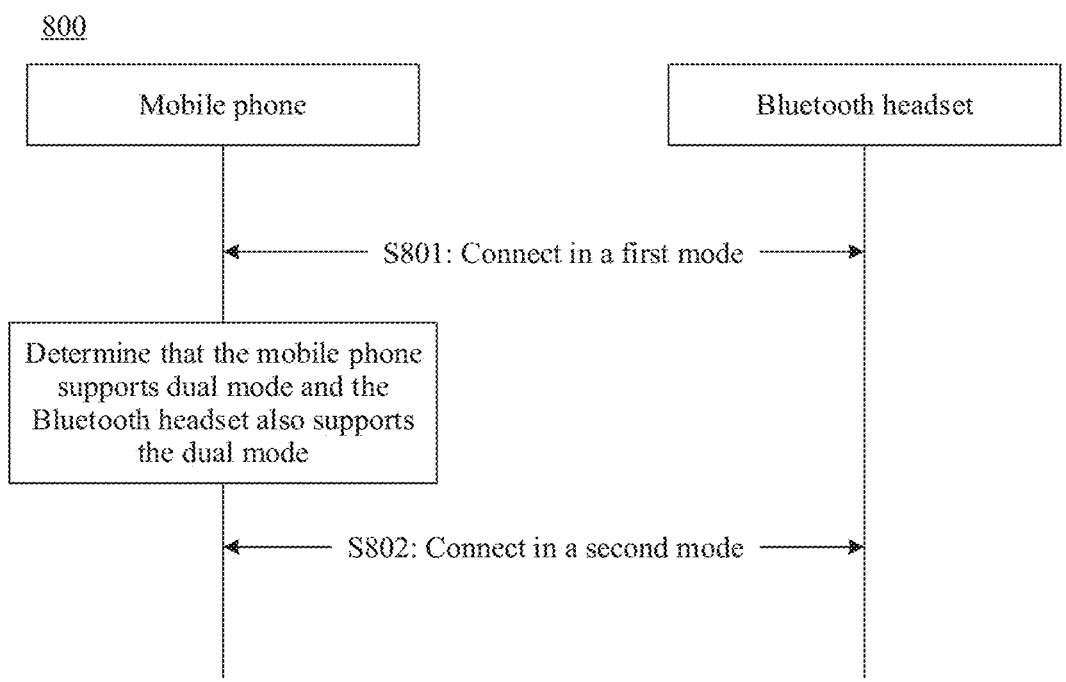
FIG. 8 is a schematic flowchart of a method for performing Bluetooth pairing and connection between a mobile phone and a Bluetooth headset according to an embodiment of this application.

FIG. 8 is a schematic flowchart of a method 800 for performing Bluetooth pairing and connection between a mobile phone and a Bluetooth headset according to an embodiment of this application. As shown in FIG. 8, the method 800 includes the following steps.

S801: Establish a connection between a mobile phone and a Bluetooth headset in a first mode.

For example, the first mode may be a BR/EDR mode.

It should be understood that, for a process in which the BR/EDR connection is established between the mobile phone and the Bluetooth headset herein, refer to the description in the method 500 and the method 700. For brevity, details are not described herein again.

It should be further understood that, in the first mode, a connection is actually established between the mobile phone and a primary earbud of the Bluetooth headset.

S802: When the mobile phone determines that the Bluetooth headset supports dual mode, and the mobile phone itself also supports the dual mode, establish a connection between the mobile phone and the Bluetooth headset in a second mode.

In an embodiment, the connection is established between the mobile phone and the Bluetooth headset in the second mode, and the connection between the mobile phone and the Bluetooth headset in the first mode is disconnected.

In this embodiment of this application, the second mode takes precedence over the first mode. After establishing an ACL link through the BR/EDR connection, the mobile phone may query whether the Bluetooth headset supports the dual mode. If both the mobile phone and the Bluetooth headset support the dual mode, a BLE connection may be established between the mobile phone and the Bluetooth headset.

For example, both the mobile phone and an accessory device (for example, a watch, a band, or the like) support the dual mode. In this case, the mobile phone may transmit data such as a heart rate and blood pressure to the accessory device through the BLE connection. This can reduce power consumption of the mobile phone and the accessory device. Alternatively, audio data, video data, or call data is transmitted by using a transmission protocol of a BLE extended connection.

If the mobile phone supports the dual mode but the accessory device does not support the dual mode, or if the mobile phone does not support the dual mode but the accessory device supports the dual mode, the mobile phone may continue to perform operations such as (BR/EDR) pairing/SDP/encryption after establishing the ACL link through the MEM connection, so that the BR/EDR connection is established between the mobile phone and the accessory device, and then data transmission is performed.

It should be understood that, if the mobile phone does not support the dual mode, the mobile phone supports the dual mode but the Bluetooth headset does not support the dual mode, or the mobile phone does not support the dual mode but the Bluetooth headset supports the dual mode, the connection between the mobile phone and the Bluetooth headset may continue to be established in the first mode.

It should be further understood that, in the second mode, BLE connections are actually established between the mobile phone, and the primary earbud and a secondary earbud of the Bluetooth headset. In other words, BLE connections are established between the mobile phone, and a left earbud and a right earbud of the Bluetooth headset.

In this embodiment of this application, a BLE mode is more power efficient for an electronic device than the BR/EDR mode.

The following describes the BLE mode in this embodiment of this application.

Figure 9:
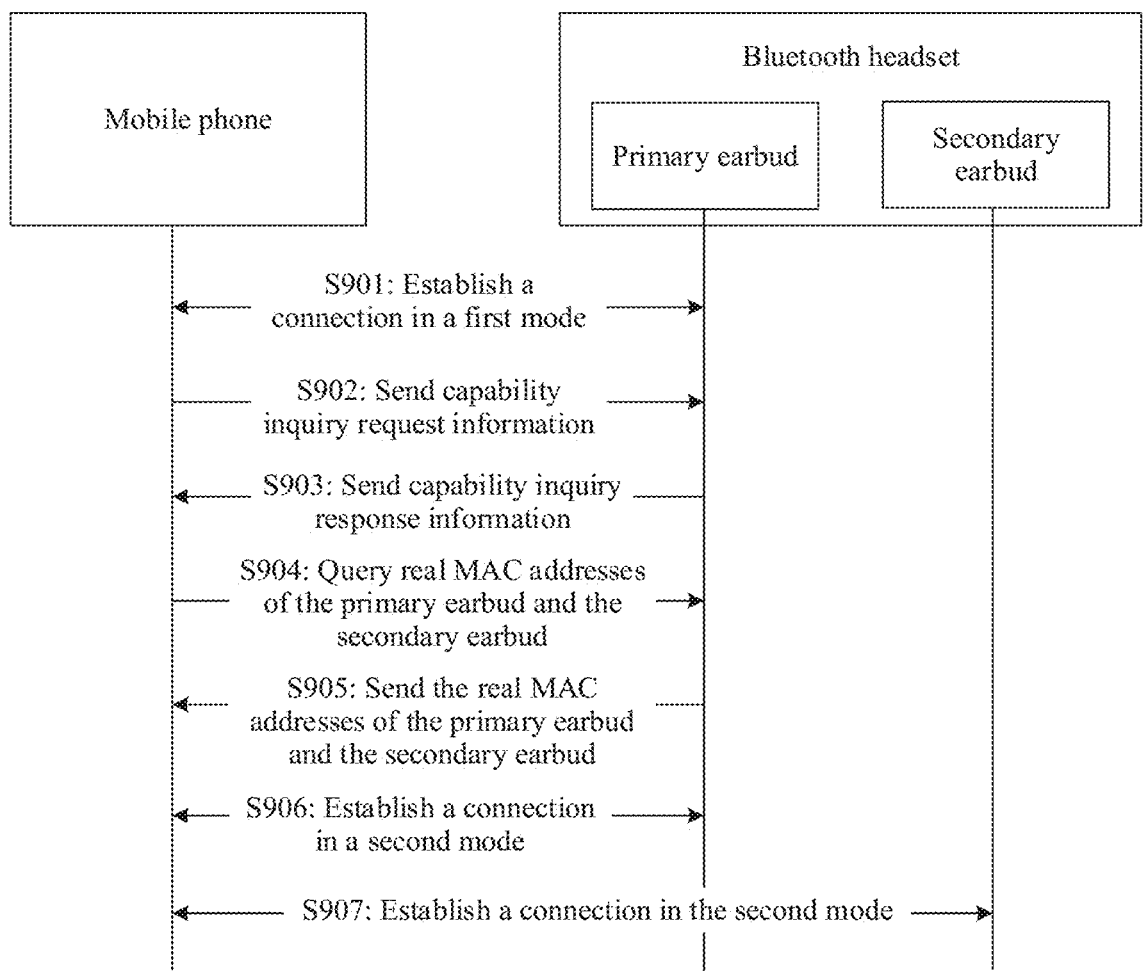
FIG. 9 is a schematic flowchart of a method for performing Bluetooth pairing and connection between a mobile phone and a Bluetooth headset according to an embodiment of this application.
Figure 10A:
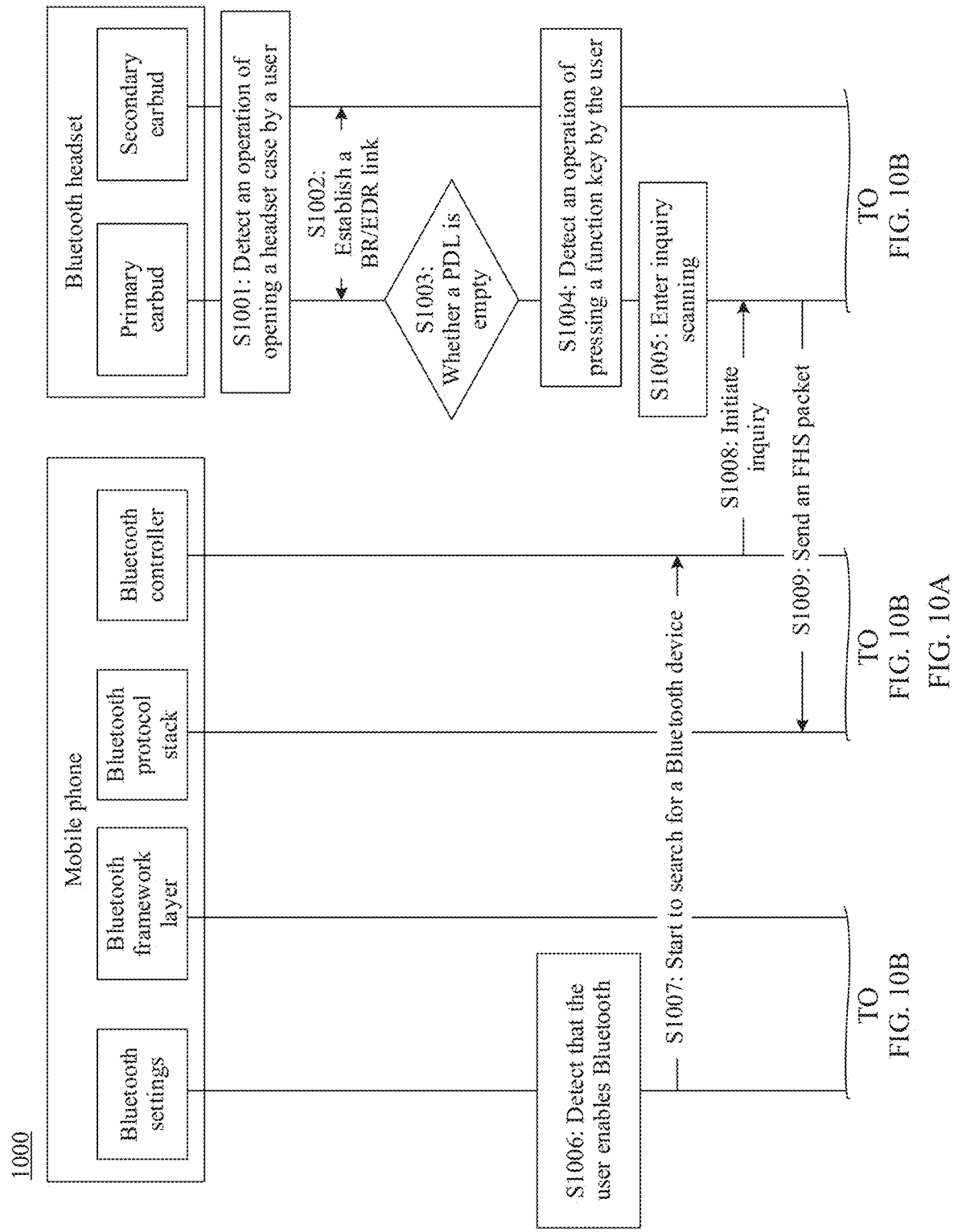
Figure 10D:
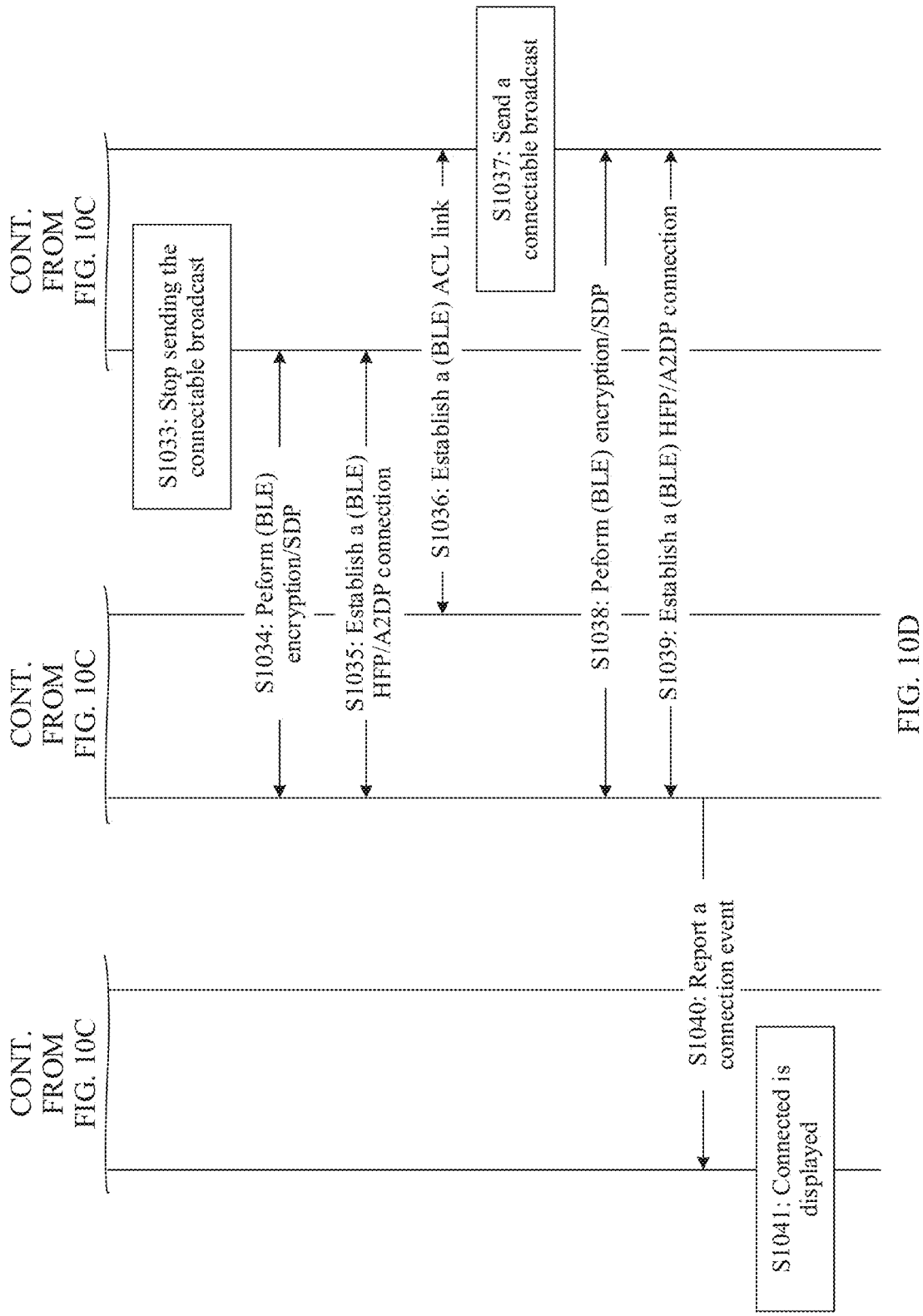

FIG. 9 is a schematic flowchart of a method 900 for performing Bluetooth pairing and connection between a mobile phone and a Bluetooth headset according to an embodiment of this application. As shown in FIG. 9, the method 900 includes the following steps.

S901: Establish a connection between a mobile phone and a Bluetooth headset in a first mode.

For example, the first mode may be a BR/EDR mode. A BR/EDR connection is actually established between the mobile phone and a primary earbud.

It should be understood that, for a process in which the BR/EDR connection is established between the mobile phone and the Bluetooth headset herein, refer to the description in the method 500 and the method 700. For brevity, details are not described herein again.

S902: The mobile phone sends capability inquiry request information to the Bluetooth headset, where the capability inquiry request information is used to query whether the Bluetooth headset supports dual mode.

For example, the mobile phone sends the capability inquiry request information to the primary earbud.

For example, the mobile phone sends the inquiry request information to the Bluetooth headset by using echo. For example, the mobile phone may send an echo request (echo request) message to the Bluetooth headset, and adds the capability inquiry request information in the echo request message. The Bluetooth headset may send an echo response (echo response) message to the mobile phone, and adds the capability inquiry response information in the echo response message.

It should be understood that S902 may be querying capability when the BR/EDR connection has been established between the mobile phone and the Bluetooth headset in S901. Alternatively, in a process in which the BR/EDR connection is established between the mobile phone and the Bluetooth headset in S901, after an ACL link is established between the mobile phone and the primary earbud, the mobile phone may send the capability inquiry request information to the Bluetooth headset. In this way, the mobile phone may determine, before establishing a BR/EDR protocol and a profile with the primary earbud, whether the Bluetooth headset supports the dual mode. If the mobile phone determines that the Bluetooth headset supports the dual mode, the subsequent BR/EDR connection establishment process may be avoided, and a BLE connection is quickly switched to. This helps reduce a delay in establishing the BLE connection between the mobile phone and the Bluetooth headset.

S903: The primary earbud sends capability inquiry response information to the mobile phone, where the capability inquiry response information is used to indicate that the Bluetooth headset supports the dual mode.

For example, the primary earbud sends the capability inquiry response information to the mobile phone.

S904: The mobile phone queries real MAC addresses of the primary earbud and a secondary earbud from the primary earbud.

For example, a MAC address of a left earbud of the Bluetooth headset is a MAC address 1, and a MAC address of a right earbud of the Bluetooth headset is a MAC address 2. In a BR/EDR mode, the Bluetooth headset may statistically set the right earbud to the primary earbud before a case is opened. After the case is opened, the Bluetooth headset uses the MAC address 2 to establish the BR/EDR connection to the mobile phone.

After detecting that a user opens the case, the Bluetooth headset may further dynamically adjust the primary earbud based on a position and a battery level. For example, when determining that the left earbud is in an ear of the user and the right earbud is not in an ear of the user, the Bluetooth headset may determine that the left earbud is the primary earbud. After the case is opened, a connection is established between the left earbud and right earbud. Therefore, the left earbud also learns the MAC address of the right earbud. In this case, the left earbud can use the MAC address 2 to establish the BR/EDR connection to the mobile phone.

For example, the Bluetooth headset may have a wearing detection function. For example, the Bluetooth headset may detect a position of the headset by using an optical proximity sensor. In a dynamic address change process, a position of the left earbud or the right earbud is detected by using the optical proximity sensor. The optical proximity sensor may determine whether the left earbud or the right earbud is located in the ear of the user, or the optical proximity sensor may determine whether the left earbud or the right earbud falls off from the ear of the user.

For another example, if both the left earbud and the right earbud are in ears of the user, the Bluetooth headset may determine the primary earbud based on battery levels of the left earbud and the right earbud. If the battery level of the right earbud is higher than the battery level of the left earbud, the Bluetooth headset may determine that the right earbud is the primary earbud. In this case, the right earbud may establish the BR/EDR connection to the mobile phone by using the MAC address 2.

In a BLE mode, for the mobile phone, the mobile phone stores address information: the MAC address 2. In this case, the mobile phone may query MAC addresses of the primary earbud and the secondary earbud from the primary earbud by using the MAC address 2.

S905: The primary earbud sends the real MAC addresses of the primary earbud and the secondary earbud to the mobile phone.

For example, if the right earbud is located in the ear of the user, and the left earbud is not located in the ear of the user, the right earbud is the primary earbud. The primary earbud (right earbud) may establish the ACL link to the mobile phone by using the MAC address 2, and the mobile phone queries the primary earbud (right earbud) whether the dual mode is supported. If capability inquiry response information returned by the primary earbud (right earbud) indicates that the dual mode is supported, the mobile phone continues to query MAC address information from the primary earbud (right earbud). The primary earbud (right earbud) returns the real MAC address of the primary earbud (right earbud) to the mobile phone, where the real MAC address of the primary earbud (right earbud) is the MAC address 2. The MAC address of the opposite earbud (left earbud) is the MAC address 1.

It should be understood that, when the (BR/EDR) ACL link is established between the primary earbud (right earbud) and the mobile phone, the MAC address 2 may be used to establish the ACL link to the mobile phone. When reporting the real MAC addresses of the primary earbud (right earbud) and the secondary earbud to the mobile phone, the primary earbud (right earbud) may report the MAC address 2 and the MAC address 1, to indicate that the real MAC address of the primary earbud (right earbud) is the MAC address 2, and the real MAC address of the opposite earbud (left earbud) is the MAC address 1.

For example, Table 1 shows a working mode of the primary earbud in the BR/EDR mode and the BLE mode when the right earbud is the primary earbud.

TABLE 1

| Working mode of the primary earbud in the BR/EDR mode and the BLE mode | | |
| --- | --- | --- |
| | BR/EDR mode | BLE mode |
| Primary earbud (right earbud) | Establish the BR/EDR connection to the mobile phone by using the MAC address 2 | Establish the BLE connection to the mobile phone by using the MAC address 2 |
| Secondary earbud (left earbud) | Listen to the link between the primary earbud and the mobile phone | Establish the BLE connection to the mobile phone by using the MAC address 1 |

For example, if the left earbud is located in the ear of the user, and the right earbud is not located in the ear of the user, the left earbud is the primary earbud. The primary earbud (left earbud) may establish the ACL link to the mobile phone by using the MAC address 2, and the mobile phone queries the primary earbud (left earbud) whether the dual mode is supported. If capability inquiry response information returned by the primary earbud (left earbud) indicates that the dual mode is supported, the mobile phone continues to query MAC address information from the primary earbud (left earbud). The primary earbud (left earbud) returns the real MAC address of the primary earbud (left earbud) to the mobile phone, where the real MAC address of the primary earbud (left earbud) is the MAC address 1. The MAC address of the opposite earbud (right earbud) is the MAC address 2.

It should be understood that, when the (BR/EDR) ACL link is established between the primary earbud (left earbud) and the mobile phone, the MAC address 2 may be used to establish the ACL link to the mobile phone. When reporting the real MAC addresses of the primary earbud (left earbud) and the secondary earbud to the mobile phone, the primary earbud (left earbud) may report the MAC address 1 and the MAC address 2, to indicate that the real MAC address of the primary earbud (left earbud) is the MAC address 1, and the real MAC address of the opposite earbud (right earbud) is the MAC address 2.

For example, Table 2 shows another working mode of the primary earbud in the BR/EDR mode and the BLE mode when the left earbud is the primary earbud.

TABLE 2

Another working mode of the primary earbud in the BR/EDR mode and the BLE mode

|  | BR/EDR mode | BLE mode |
| --- | --- | --- |
| Primary earbud (left earbud) | Establish the BR/EDR connection to the mobile phone by using the MAC address 2 | Establish the BLE connection to the mobile phone by using the MAC address 1 |
| Secondary earbud (right earbud) | Listen to the link between the primary earbud and the mobile phone | Establish the BLE connection to the mobile phone by using the MAC address 2 |

S906: Establish a connection between the mobile phone and the primary earbud in a second mode.

For example, the second mode is the BLE mode.

In an embodiment, a process in which the BLE connection is established between the mobile phone and the real MAC address of the primary earbud includes: A (BLE) ACL link is established between the mobile phone and the real MAC address of the primary earbud; a (BLE) SDP/encryption process is performed between the mobile phone and the real MAC address of the primary earbud; and a (BLE) HFP/A2DP connection is established between the mobile phone and the real MAC address of the primary earbud.

S907: Establish a connection between the mobile phone and the secondary earbud in the second mode.

In an embodiment, a process in which the BLE connection is established between the mobile phone and the real MAC address of the secondary earbud includes: A (BLE) ACL link is established between the mobile phone and the real MAC address of the secondary earbud, a (BLE) SDP/encryption process is performed between the mobile phone and the real MAC address of the secondary earbud; and a (BLE) HFP/A2DP connection is established between the mobile phone and the real MAC address of the secondary earbud.

For example, when the right earbud is the primary earbud, the primary earbud (right earbud) returns the real MAC address of the primary earbud (right earbud) to the mobile phone, where the real MAC address of the primary earbud (right earbud) is the MAC address 2. The MAC address of the opposite earbud (left earbud) is the MAC address 1. The BLE connection is actually established between the mobile phone and the real MAC address (MAC address 2) of the primary earbud (right earbud). The BLE connection is established between the mobile phone and the real MAC address (MAC address 1) of the secondary earbud (left earbud).

For example, when the left earbud is the primary earbud, the primary earbud (left earbud) returns the real MAC address of the primary earbud (left earbud) to the mobile phone, where the real MAC address of the primary earbud (left earbud) is the MAC address 1. The MAC address of the opposite earbud (right earbud) is the MAC address 2. The BLE connection is actually established between the mobile phone and the real MAC address (MAC address 1) of the primary earbud (left earbud). The BLE connection is established between the mobile phone and the real MAC address (MAC address 2) of the secondary earbud (right earbud).

FIG. 10A to FIG. 10D are a schematic flowchart of a method 1000 for performing Bluetooth pairing and connection between a mobile phone and a Bluetooth headset according to an embodiment of this application. As shown in FIG. 10A to FIG. 10D, the method 1000 includes the following steps.

S1001: The Bluetooth headset detects an operation of opening a headset case by a user.

S1002: Establish a BR/EDR connection between a left earbud and a right earbud of the Bluetooth headset in response to the operation of opening the headset case by the user.

S1003: A primary earbud determines whether a paired device list (paired device list, PDL) PDL is empty.

It should be understood that, for a process in which the Bluetooth headset determines the primary earbud and the secondary earbud, refer to the description in the method 500. For brevity, details are not described herein again.

For example, if the PDL is not empty, the primary earbud may initiate paging by using a MAC address of an electronic device connected last time.

For another example, if the PDL is empty, the case of the Bluetooth headset is opened for an initial time, or the Bluetooth headset is not connected to another electronic device when the case is opened last time.

S1004: The Bluetooth headset detects an operation of pressing a function key by the user.

S1005: In response to the operation of pressing the function key by the user, the Bluetooth headset enters inquiry scanning (inquiry scan).

S1006: A Bluetooth settings (settings) interface of the mobile phone detects an operation of enabling Bluetooth by the user.

S1007: In response to the operation of enabling Bluetooth by the user, Settings sends an instruction to a Bluetooth controller (Bluetooth controller), to instruct the Bluetooth controller to start to search for a Bluetooth device.

S1008: The Bluetooth controller initiates inquiry (inquiry) to a surrounding device.

S1009: After receiving the inquiry, the primary earbud sends an FHS packet to the Bluetooth controller of the mobile phone, where the FHS packet includes a MAC address of the primary earbud.

For example, a MAC address of a left earbud is a MAC address 1, and a MAC address of a right earbud of the Bluetooth headset is a MAC address 2. Before the case is opened, the Bluetooth headset may statically configure the right earbud as the primary earbud. When determining that the right earbud is located in an ear and the left earbud is not located in an ear of the user, the Bluetooth headset may determine that the right earbud is the primary earbud. In this case, the right earbud reports an FHS packet, where the FHS packet includes the MAC address 2.

S1010: After receiving the FHS packet, the mobile phone sends device name inquiry information to the primary earbud.

S1011: The primary earbud returns a device name of the Bluetooth headset to the mobile phone.

For example, the device name of the Bluetooth device is "Bluetooth headset".

Figure 6F:
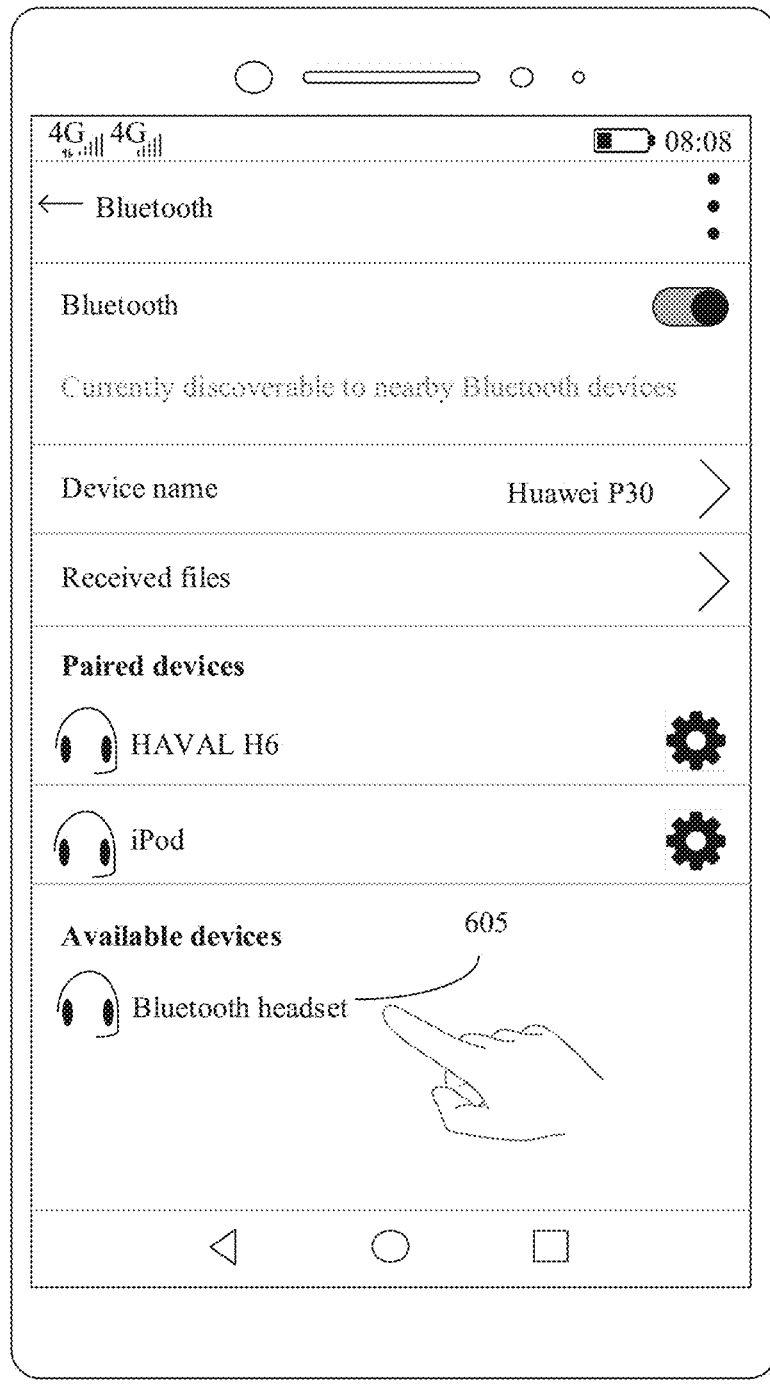

For example, as shown in FIG. 6(f), the Bluetooth device whose device name is "Bluetooth headset" may be displayed in Available devices on the Bluetooth settings interface of the mobile phone.

S1012: The mobile phone displays the device name "Bluetooth headset" of the Bluetooth device in Available devices on the Bluetooth settings interface.

S1013: The mobile phone detects an operation of tapping the device name of the Bluetooth device by the user.

S1014: The mobile phone initiates paging for the MAC address 2 in response to the operation of tapping the device name of the Bluetooth device by the user.

S1015: After the primary earbud in page scanning receives paging sent by the mobile phone, establish a (BR/EDR) ACL link between the Bluetooth controller (Bluetooth controller) of the mobile phone and the primary earbud.

It should be understood that S1001 to S1015 are described by using an example in which the mobile phone actively searches for the Bluetooth headset. For the process, refer to the description of a process of S701 to S712 in the foregoing method 700.

It should be further understood that S1001 to S1015 may also be replaced with a process of S501 to S506 in the foregoing method 500. To be specific, the mobile phone may establish the (BR/EDR) ACL link to the primary earbud through active search, or the Bluetooth headset may establish the (BR/EDR) ACL link to the mobile phone through proximity discovery.

S1016: A Bluetooth stack (Bluetooth stack) of the mobile phone sends capability inquiry request information to the primary earbud, to query whether the Bluetooth headset supports dual mode.

In this embodiment of this application, after the ACL link is established between the mobile phone and the Bluetooth headset, the mobile phone may send the capability inquiry request information to the Bluetooth headset. In this way, capability interaction can be performed without a Bluetooth connection established between the mobile phone and the Bluetooth headset. When both the mobile phone and the Bluetooth headset support the dual mode, this helps reduce a delay in establishing a connection between the mobile phone and the Bluetooth headset in a second mode.

S1017: The primary earbud sends capability inquiry response information to the mobile phone, where the capability inquiry response information is used to indicate that the Bluetooth headset supports the dual mode.

For example, the mobile phone sends the capability inquiry request information to the primary earbud by using echo, to confirm a version supported by both parties. This ensures version compatibility.

S1018: The Bluetooth stack of the mobile phone determines whether the Bluetooth stack supports the dual mode.

It should be understood that, if both the mobile phone and the Bluetooth headset support the dual mode and have a same major version, the mobile phone and the Bluetooth headset may enter the second mode for connection.

It should be understood that there is no actual sequence between S1018, and S1016 and S1017. It may be that the mobile phone first determines whether the mobile phone supports the dual mode. After determining that the mobile phone supports the dual mode, the mobile phone performs S1016. It may be that the mobile phone performs S1016 and S1017. After determining that the Bluetooth headset supports the dual mode, the mobile phone determines whether the mobile phone supports the dual mode.

If the Bluetooth stack of the mobile phone determines that the Bluetooth stack does not support the dual mode, steps S1019 to S1021 are performed.

If the Bluetooth stack of the mobile phone determines that the Bluetooth stack also supports the dual mode, steps after S1022 are performed.

S1019: The Bluetooth stack of the mobile phone and the primary earbud perform a (BR/EDR) pairing/SDP/encryption process.

S1020: The Bluetooth stack of the mobile phone reports a connection event to Settings of the mobile phone.

S1021: The Bluetooth settings (settings) interface of the mobile phone displays that the mobile phone is connected to the Bluetooth headset.

Figure 6G:
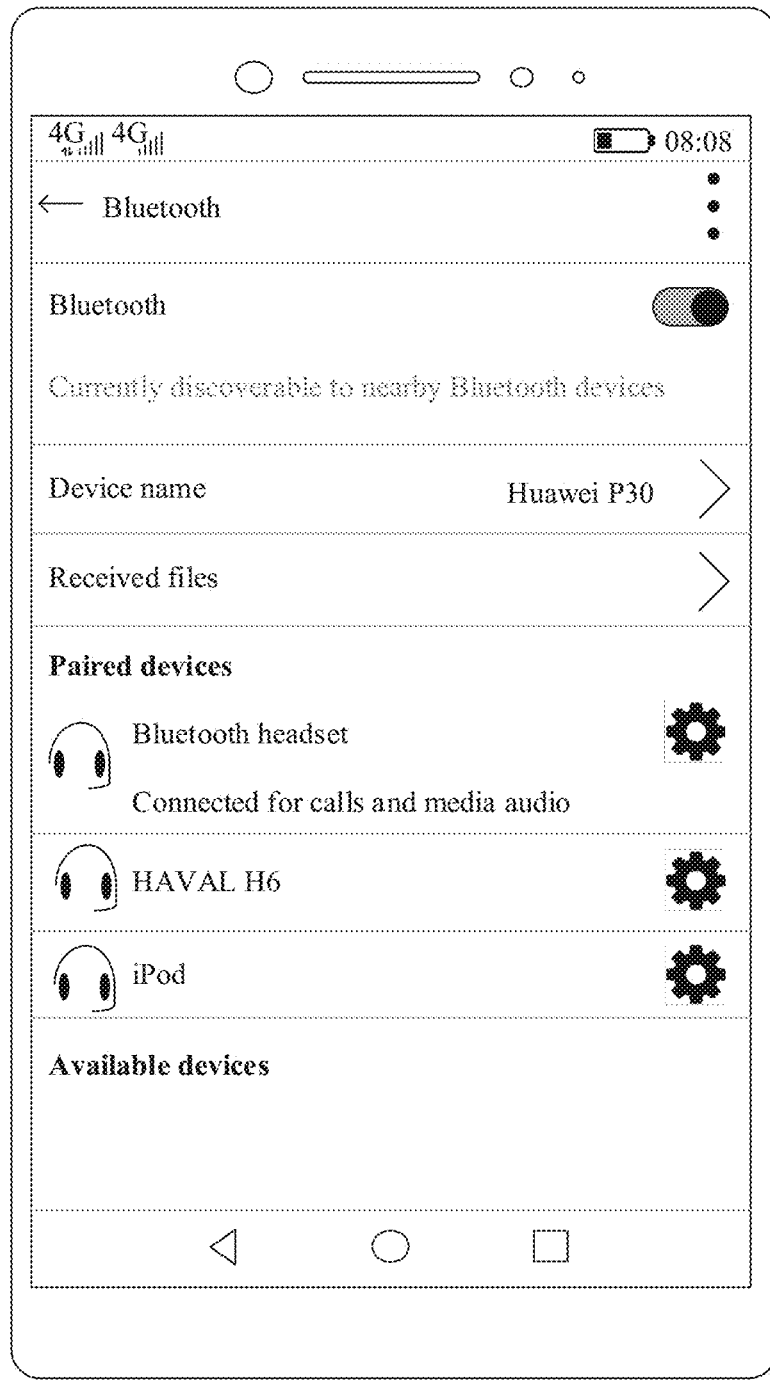

For example, as shown in FIG. 6(g), on the Bluetooth settings interface, the Bluetooth device named "Bluetooth headset" may be displayed in Paired devices to indicate that the Bluetooth device is connected to the mobile phone.

S1022: The Bluetooth stack of the mobile phone sends MAC address inquiry information to the primary earbud, where the MAC address inquiry information is used to query real MAC addresses of the primary earbud and the secondary earbud.

In an embodiment, the Bluetooth stack of the mobile phone may carry version information of the Bluetooth stack by using (BR/EDR) L2CAP echo, to confirm a second mode protocol version that can be supported by both parties. The mobile phone initiates a Bluetooth address inquiry request to the headset, and adds a BR MAC address of the mobile phone and a random BLE address in an echo request (echo request) message. After receiving the version information of the mobile phone, the Bluetooth headset may determine that the mobile phone expects to query the real MAC addresses of the primary earbud and the secondary earbud.

For example, the version information carried by the mobile phone may include one byte used to indicate a major version number, and one byte used to indicate a sub-version number.

S1023: The primary earbud sends MAC address inquiry response information to the Bluetooth stack of the mobile phone, where the MAC address inquiry response information carries the real MAC addresses of the primary earbud and the secondary earbud.

It should be understood that, for a process of S1023, refer to the description in the method 900. For brevity, details are not described herein again.

S1024: The primary earbud sends (BR/EDR) synchronization pairing information to the secondary earbud, and synchronizes, to the secondary earbud, a link key (link key) generated under BR/EDR.

S1025: The primary earbud notifies the secondary earbud to send a standard BLE non-connectable broadcast.

S1026: The primary earbud stops sending the non-connectable broadcast.

S1027: The primary earbud sends a connectable broadcast by using the real MAC address of the primary earbud, so that the mobile phone may initiate a BLE connection to the primary earbud.

S1028: The secondary earbud sends a connectable broadcast by using the real MAC address of the secondary earbud, so that the mobile phone may initiate a BLE connection to the secondary earbud.

The Bluetooth headset may first stop sending the non-connectable broadcast, and then send the connectable broadcast.

S1029: The Bluetooth stack of the mobile phone adds the real MAC addresses of the primary earbud and the secondary earbud to a whitelist.

S1030: The Bluetooth stack of the mobile phone notifies the Bluetooth controller to disconnect the ACL link between the mobile phone and the primary earbud.

S1031: The Bluetooth controller disconnects the ACL link between the mobile phone and the primary earbud.

For example, the Bluetooth stack of the mobile phone may send a (BR/EDR) ACL link disconnection event to the primary earbud, and the primary earbud may return a (BR/EDR) ACL link disconnection completion event to the Bluetooth stack.

S1032: The Bluetooth stack of the mobile phone establishes a (BLE) ACL link to the primary earbud.

S1033: The primary earbud stops sending the connectable broadcast.

S1034: The Bluetooth stack of the mobile phone performs a (BLE) encryption/SDP process with the primary earbud.

S1035: The Bluetooth stack of the mobile phone establishes a (BLE) HFP/A2DP connection to the primary earbud.

For example, when the mobile phone answers a call by using the Bluetooth headset, the HFP connection may be established between the mobile phone and the primary earbud.

For example, when the mobile phone listens to music and watches a video by using the Bluetooth headset, the A2DP connection may be connected between the mobile phone and the primary earbud.

S1036: The Bluetooth controller of the mobile phone establishes a (BLE) ACL link to the secondary earbud.

S1037: The secondary earbud stops sending the connectable broadcast.

S1038: The Bluetooth stack of the mobile phone performs a (BLE) encryption/SDP process with the secondary earbud.

S1039: The Bluetooth stack of the mobile phone establishes a (BLE) HFP/A2DP connection to the secondary earbud.

S1040: The Bluetooth stack of the mobile phone reports a connection event to Settings.

S1041: The Bluetooth settings interface of the mobile phone displays that the mobile phone is connected to the Bluetooth headset.

For example, as shown in FIG. 6(g), on the Bluetooth settings interface, the Bluetooth device named "Bluetooth headset" may be displayed in Paired devices to indicate that the Bluetooth device is connected to the mobile phone.

In this embodiment of this application, when both the mobile phone and the Bluetooth headset support the dual mode, in other words, both the mobile phone and the Bluetooth headset support a BR/EDR mode and a BLE mode, the mobile phone and the Bluetooth headset may switch from the BR/EDR mode to the BLE mode for connection. This helps reduce power consumption of the mobile phone and the Bluetooth headset.

Figure 11:
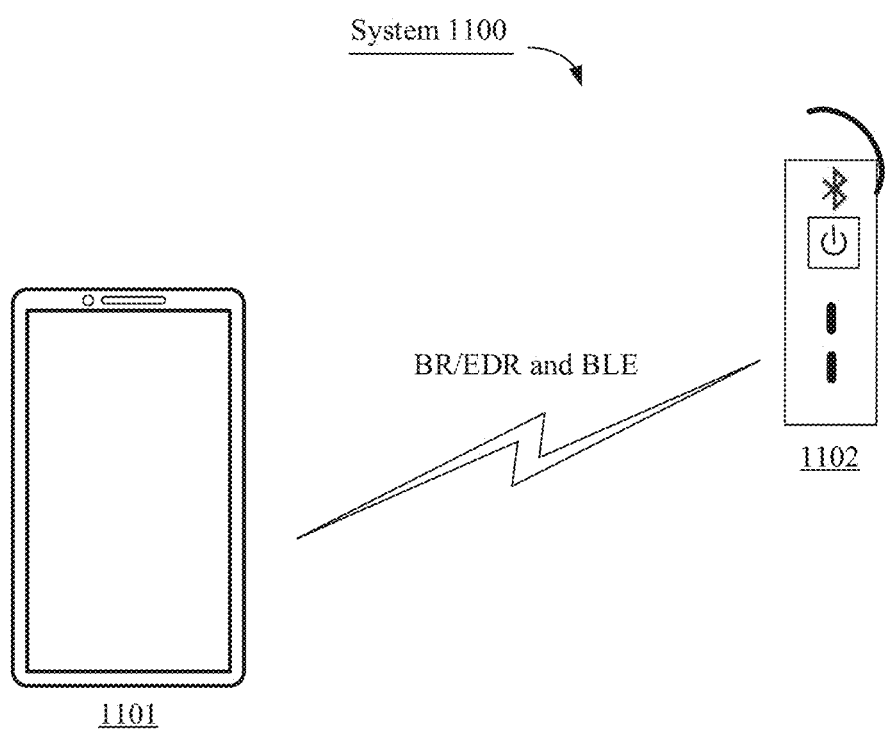
FIG. 11 is a schematic diagram of a system architecture according to an embodiment of this application.

FIG. 11 is a schematic diagram of a system architecture 1100 according to an embodiment of this application. As shown in FIG. 11, the system 1100 may include an electronic device 1101 and an accessory device 1102.

The electronic device 1101 may be the electronic device in the foregoing embodiment, and the accessory device 1102 may be the accessory device in the foregoing embodiment.

For example, the electronic device 1101 may be a smartphone, a tablet computer, a personal computer, or the like. The accessory device 1102 may be a device, for example, a Bluetooth headset, a Bluetooth speaker, a smartwatch, or the like, that supports a Bluetooth function.

A person of ordinary skill in the art may be aware that, in combination with the examples described in embodiments disclosed in this specification, units and algorithm steps may be implemented by electronic hardware or a combination of computer software and electronic hardware. Whether functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed systems, apparatuses, and methods may be implemented in other manners. For example, the described apparatus embodiments are merely examples. For example, division into units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on an actual requirement to achieve the objectives of the solutions of embodiments.

In addition, functional units in embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The foregoing storage medium includes any medium, for example, a USB flash drive, a removable hard disk, a read-only memory (Read-Only Memory, ROM), a random access memory (Random Access Memory, RAM), a magnetic disk, an optical disc, or the like that can store program code.

The foregoing description is merely a specific implementation of this application, but is not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A system comprising:
a BLUETOOTH headset supporting a dual-mode connection that comprises a basic rate (BR)/enhanced data rate (EDR) connection and a BLUETOOTH Low Energy (BLE) connection, and comprising:
   a first earbud, wherein a first media access control (MAC) address of the first earbud is a first address; and
   a second earbud; and
a first electronic device coupled to the BLUETOOTH headset, wherein a second MAC address of the second earbud is a second address that is used when a primary earbud establishes a connection to the first electronic device, and wherein the first electronic device supports the dual-mode connection and is configured to:
   establish, to the first earbud and using the second address, the BR/EDR connection when the first earbud is the primary earbud;
   disconnect the BR/EDR connection to the first earbud when the BLUETOOTH headset supports the dual-mode connection;
   establish, to the first earbud and using the first address, the BLE connection; and
   establish, to the second earbud and using the second address, the BLE connection; and
   transmit data to the BLUETOOTH headset through the BLE connection.

2. The system of claim 1, wherein the first electronic device is further configured to:
   establish an asynchronous connection-oriented link (ACL) in the BR/EDR connection to the BLUETOOTH headset;
   send, to the BLUETOOTH headset through the ACL, inquiry request information querying whether the BLUETOOTH headset accessory device supports the dual-mode connection; and
   receive, from the BLUETOOTH headset, inquiry response information indicating that the BLUETOOTH device supports the dual-mode connection.

3. The system of claim 2, wherein the first electronic device is further configured to add the inquiry request information to an echo message.

4. The system of claim 1, wherein the first electronic device is further configured to:
   identify that the primary earbud is switched from the first earbud to the second earbud; and
   in response to identifying that the primary earbud is switched from the first earbud to the second earbud:
      establish the BLE connection to the first earbud using the first address; and
      establish the BLE connection to the second earbud using the second address.

5. The system of claim 1, further comprising a second electronic device supporting the BR/EDR connection, wherein the BLUETOOTH headset is configured to:
   disconnect the BLE connection between the first earbud and the first electronic device; and
   disconnect the BLE connection between the second earbud and the first electronic device,
   wherein the second electronic device is configured to:
      establish the BR/EDR connection to the first earbud using the second address when the first earbud is the primary earbud; and
      establish the BR/EDR connection to the second earbud using the second address when the primary earbud is switched from the first earbud to the second earbud.

6. The system of claim 1, wherein the data comprises audio data.

7. The system of claim 1, wherein the data comprises video data.

8. The system of claim 1, wherein the data comprises call data.

9. A BLUETOOTH connection method implemented by an electronic device that supports a dual-mode connection, wherein the BLUETOOTH connection method comprises:
   establishing a basic rate (BR)/enhanced data rate (EDR) connection to a first earbud using a second address when the first earbud is a primary earbud, wherein a BLUETOOTH headset comprises the first earbud and a second earbud, wherein a first media access control (MAC) address of the first earbud is a first address, wherein a second MAC address of the second earbud is the second address that is used when the primary earbud establishes a connection to the electronic device, and wherein the dual-mode connection comprises the BR/EDR connection and a BLUETOOTH Low Energy (BLE) connection;
   disconnecting the BR/EDR connection to the first earbud when the BLUETOOTH headset supports the dual-mode connection;
   establishing, to the first earbud and using the first address, the BLE connection; and
   establishing, to the second earbud and using the second address, the BLE connection; and
   transmitting data to the BLUETOOTH headset through the BLE connection.

10. The BLUETOOTH connection method of claim 9, wherein before disconnecting the BR/EDR connection, the BLUETOOTH connection method further comprises:
   sending, to the BLUETOOTH headset through an asynchronous connection-oriented link (ACL) in the BR/EDR connection, inquiry request information querying whether the BLUETOOTH headset supports the dual-mode connection; and
   receiving, from the BLUETOOTH headset, inquiry response information indicating that the BLUETOOTH headset supports the dual-mode connection.

11. The BLUETOOTH connection method of claim 10, further comprising sending, to the BLUETOOTH headset, an echo message carrying the inquiry request information.

12. A BLUETOOTH connection method implemented by a BLUETOOTH headset supporting a dual-mode connection and comprising a first earbud and a second earbud, wherein a first media access control (MAC) address of the first earbud is a first address, wherein a second MAC address of the second earbud is a second address that is used when a primary earbud establishes a connection to an electronic device, and wherein the BLUETOOTH connection method comprises:
   establishing, by the first earbud and using the second address, a basic rate (BR)/enhanced data rate (EDR) connection to the electronic device when the first earbud is the primary earbud, wherein the dual-mode connection comprises the BR/EDR connection and a BLUETOOTH Low Energy (BLE) connection;
   sending, to the electronic device, indication information indicating that the BLUETOOTH headset supports the dual-mode connection;
   disconnecting, by the first earbud, the BR/EDR connection to the electronic device;

establishing, by the first earbud and using the first address, the BLE connection to the electronic device;

establishing, by the second earbud and using the second address, the BLE connection to the electronic device; and transmitting data to the electronic device through the BLE connection.

13. The BLUETOOTH connection method of claim 12, further comprising further sending, to the electronic device through an asynchronous connection-oriented link (ACL) after establishing the ACL in the BR/EDR connection to the electronic device, the indication information.

14. An electronic device supporting a dual-mode connection, wherein the electronic device comprises:
a BLUETOOTH chip;
a memory configured to store; and
a processor coupled to the BLUETOOTH chip and the memory, wherein the instructions, when executed by the processor, cause the electronic device to:
establish a basic rate (BR)/enhanced data rate (EDR) connection to a first earbud using a second address when the first earbud is a primary earbud, wherein a BLUETOOTH headset comprises the first earbud and a second earbud, wherein a first media access control (MAC) address of the first earbud is a first address, wherein a second MAC address of the second earbud is the second address that is used when the primary earbud establishes a connection to the electronic device, and wherein the dual-mode connection comprises the BR/EDR connection and a BLUETOOTH Low Energy (BLE) connection; and
disconnect the BR/EDR connection to the first earbud when the BLUETOOTH headset supports the dual-mode connection;
establish, to the first earbud and using the first address, the BLE connection;
establish, to the second earbud and using the second address, the BLE connection; and
transmit data to the BLUETOOTH headset through the BLE connection.

15. The electronic device of claim 14, wherein when executed by the processor, the instructions further cause the electronic device to:
send, to the BLUETOOTH headset through an asynchronous connection-oriented link (ACL) in the BR/EDR connection, inquiry request information querying whether the BLUETOOTH headset supports the dual-mode connection before disconnecting the BR/EDR connection to the BLUETOOTH headset; and
receive, from the BLUETOOTH headset, inquiry response information indicating that the BLUETOOTH headset supports the dual-mode connection.

16. The electronic device of claim 15, wherein when executed by the processor, the instructions further cause the electronic device to send, to the BLUETOOTH headset, an echo message carrying the inquiry request information.

17. The electronic device of claim 14, wherein when executed by the processor, the instructions further cause the electronic device to:
when the first earbud is the primary earbud:
establish the BLE connection to the first earbud using the first address; and
establish the BLE connection to the second earbud using the second address; and
when the primary earbud is switched from the first earbud to the second earbud:
establish the BLE connection to the first earbud using the first address; and
establish the BLE connection to the second earbud using the second address.

18. A BLUETOOTH headset supporting a dual-mode connection, wherein the BLUETOOTH headset comprises:
a first earbud, wherein a first media access control (MAC) address of the first earbud is a first address;
a second earbud, wherein a second MAC address of the second earbud is a second address that is used when a primary earbud establishes a connection to an electronic device;
a BLUETOOTH chip;
a memory configured to store instructions; and
a processor coupled to the BLUETOOTH chip and the memory, wherein when executed by the processor, the instructions cause the BLUETOOTH headset to:
establish, by the first earbud and using the second address, a basic rate (BR)/enhanced data rate (EDR) connection to the electronic device when the first earbud is the primary earbud, wherein the dual-mode connection comprises the BR/EDR connection and a BLUETOOTH Low Energy (BLE) connection;
send, to the electronic device, indication information indicating that the BLUETOOTH headset supports the dual-mode connection;
disconnect the BR/EDR connection to the electronic device;
establish, by the first earbud and using the first address, the BLE connection to the electronic device;
establish, by the second earbud and using the second address, the BLE connection to the electronic device; and
transmit data to the electronic device through the BLE connection.

19. The BLUETOOTH headset of claim 18, wherein when executed by the processor, the instructions further cause the BLUETOOTH headset to further send, to the electronic device through an asynchronous connection-oriented link (ACL) after the BLUETOOTH headset establishes the ACL in the BR/EDR connection to the electronic device, the indication information.

20. The BLUETOOTH headset of claim 18, wherein when executed by the processor, the instructions further cause the BLUETOOTH headset to:
when the first earbud is the primary earbud:
control the first earbud to establish the BLE connection to the electronic device using the first address; and
control the second earbud to establish the BLE connection to the electronic device using the second address; and
when the primary earbud is switched from the first earbud to the second earbud:
control the first earbud to establish the BLE connection to the electronic device using the first address; and
control the second earbud to establish the BLE connection to the electronic device using the second address.

* * * * *

UNITED STATES PATENT AND TRADEMARK OFFICE
CERTIFICATE OF CORRECTION

| | |
|---|---|
| PATENT NO. | : 11,825,539 B2 |
| APPLICATION NO. | : 17/640639 |
| DATED | : November 21, 2023 |
| INVENTOR(S) | : Yuhong Zhu et al. |

It is certified that error appears in the above-identified patent and that said Letters Patent is hereby corrected as shown below:

In the Claims

Claim 2, Column 35, Line 39: "BLUETOOTH headset accessory device supports the" should read "BLUETOOTH headset supports the"

Claim 2, Column 35, Line 43: "device supports the dual-mode connection." should read "headset supports the dual-mode connection."

Signed and Sealed this
Fourteenth Day of May, 2024

Katherine Kelly Vidal
*Director of the United States Patent and Trademark Office*